(12) United States Patent
Carl et al.

(10) Patent No.: US 9,861,236 B2
(45) Date of Patent: Jan. 9, 2018

(54) TOWEL WARMER FOR USE IN CONJUNCTION WITH A HOT TUB

(71) Applicants: Allen L Carl, Slingerlands, NY (US); David DiGiulio, Castleton, NY (US); Anthony Farinella, Cape Coral, FL (US)

(72) Inventors: Allen L Carl, Slingerlands, NY (US); David DiGiulio, Castleton, NY (US); Anthony Farinella, Cape Coral, FL (US)

( * ) Notice: Subject to any disclaimer, the term of this patent is extended or adjusted under 35 U.S.C. 154(b) by 997 days.

(21) Appl. No.: 14/183,672

(22) Filed: Feb. 19, 2014

(65) Prior Publication Data

US 2015/0230671 A1    Aug. 20, 2015
US 2017/0325639 A9    Nov. 16, 2017

Related U.S. Application Data

(62) Division of application No. 11/480,011, filed on Jun. 30, 2006, now Pat. No. 8,732,870.

(51) Int. Cl.

| | |
|---|---|
| *F28F 27/02* | (2006.01) |
| *A47K 10/06* | (2006.01) |
| *A61H 33/00* | (2006.01) |
| *F28D 7/10* | (2006.01) |
| *E04H 4/14* | (2006.01) |

(Continued)

(52) U.S. Cl.
CPC ............. *A47K 10/06* (2013.01); *A61H 33/60* (2013.01); *E04H 4/14* (2013.01); *F28D 7/10* (2013.01); *F28D 1/0206* (2013.01); *F28D 20/0056* (2013.01); *F28D 2020/0026* (2013.01)

(58) Field of Classification Search
CPC .......... F28D 20/00; F28D 7/10; F28D 1/0206; F28D 2020/0026; F28D 20/0043; F28D 20/0056; F28D 2020/006; F28D 2020/0095; A47K 10/06; A47K 3/001; A61H 33/60; A61H 2033/0045; A61H 2201/0257; A61H 2201/0264; A47J 36/24; B65D 81/3484; B65D 81/34; B65D 2581/3458; F24H 1/182; F24J 2/0472; B63C 2011/027; B63C 11/28

See application file for complete search history.

(56) References Cited

U.S. PATENT DOCUMENTS 1,838,086 A * 12/1931 Farnstrom ............ A47C 15/006
                                                       441/131
2,137,676 A * 11/1938 Martin ................. A47J 36/2411
                                                       126/19.5

(Continued)

*Primary Examiner* — Len Tran
*Assistant Examiner* — Jon T Schermerhorn
(74) *Attorney, Agent, or Firm* — Lawrence D. Cutter, Esq.

(57) ABSTRACT

A retrofittable towel warmer for use with a hot tub preferably comprises a flexible conduit portion which is attachable to one of the jets of the hot tub together with a rigid thermally conductive portion which is detachably mountable on an exterior mast support. There is also preferably provided an exterior housing surrounding the thermally conductive portion designed to provide maximum thermal contact with the cloth material to be heated. The entire unit may be immersed in the hot tub or pool water when not in use. In an alternate embodiment a container having a thermally absorptive medium is provided in a structure which is easily mounted on the mast. In an alternate embodiment a container having a thermally absorptive medium is provided in a structure which is easily mounted on a supporting mast.

4 Claims, 26 Drawing Sheets

(51) Int. Cl.
*F28D 20/00* (2006.01)
*F28D 1/02* (2006.01)

(56) References Cited

U.S. PATENT DOCUMENTS

| | | | | |
|---|---|---|---|---|
| 3,200,879 A * | 8/1965 | Scanlon | ............... | A47J 36/24 |
| | | | | 165/111 |
| 4,291,672 A * | 9/1981 | Ricks | ............... | F24J 2/0472 |
| | | | | 126/565 |
| 4,597,435 A * | 7/1986 | Fosco, Jr. | ............... | A47J 36/2411 |
| | | | | 126/261 |
| 4,976,308 A * | 12/1990 | Faghri | ............... | F28D 15/02 |
| | | | | 165/10 |
| 5,269,368 A * | 12/1993 | Schneider | ............... | A47J 36/24 |
| | | | | 165/135 |
| 5,709,945 A * | 1/1998 | Lee | ............... | C09K 5/06 |
| | | | | 165/104.17 |
| 6,400,896 B1 * | 6/2002 | Longardner | ............... | F28D 20/02 |
| | | | | 126/400 |
| 6,427,863 B1 * | 8/2002 | Nichols | ............... | A47J 39/00 |
| | | | | 220/23.86 |
| 7,059,387 B2 * | 6/2006 | Kolowich | ............... | A47G 19/127 |
| | | | | 165/10 |
| 2004/0251011 A1 * | 12/2004 | Kudo | ............... | F28D 20/00 |
| | | | | 165/172 |
| 2006/0107454 A1 * | 5/2006 | Spicer | ............... | A61H 33/0087 |
| | | | | 4/541.1 |
| 2008/0000021 A1 * | 1/2008 | Carl | ............... | A47K 10/06 |
| | | | | 4/541.1 |

\* cited by examiner

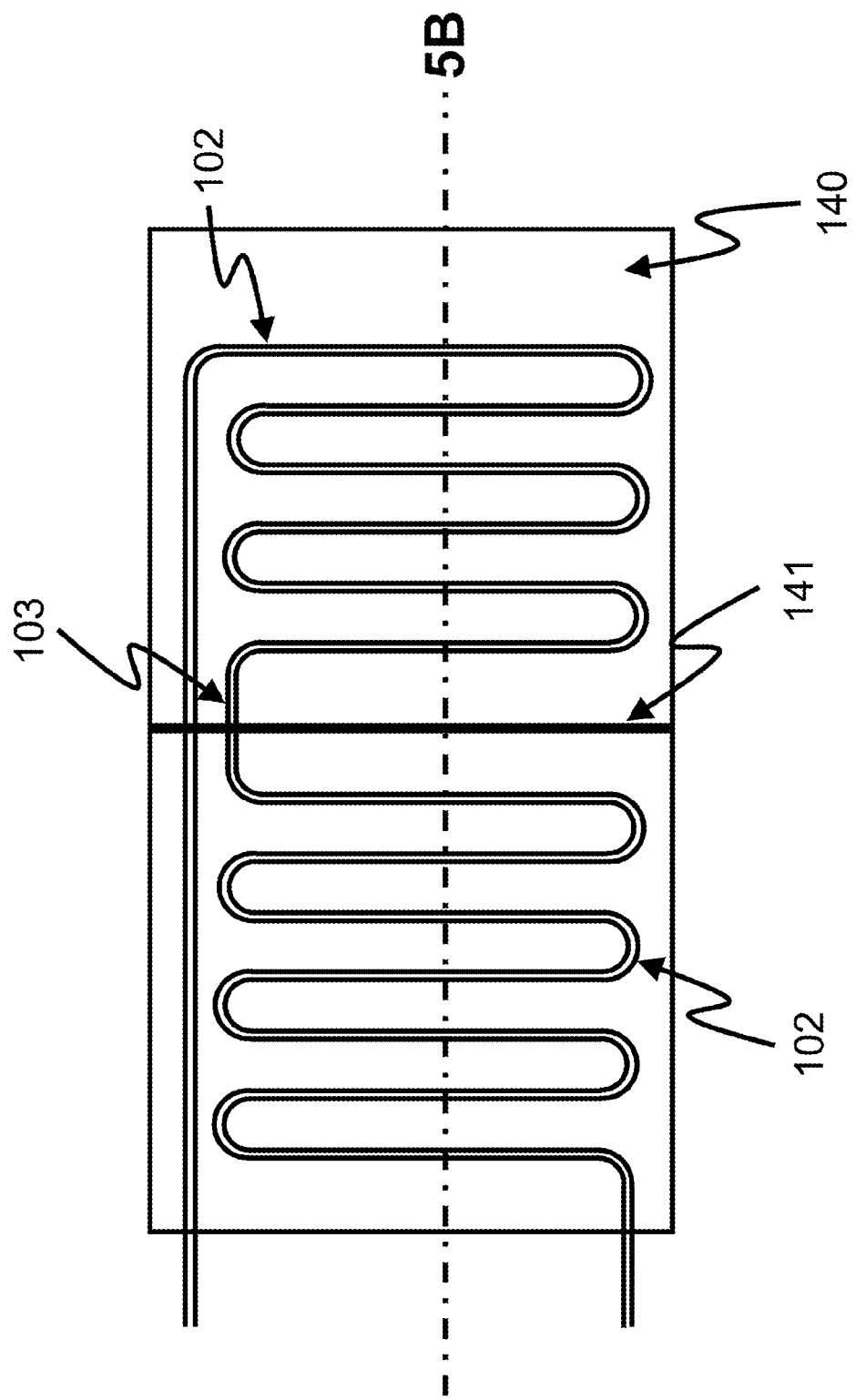

TOWEL WARMER FOR USE IN CONJUNCTION WITH A HOT TUB

CROSS-REFERENCE TO RELATED APPLICATIONS

This application is a divisional application of application Ser. No. 11/480,011 filed on Jun. 30, 2006.

TECHNICAL FIELD

The present invention is generally directed to towel warmers usable in conjunction with a hot tub. More particularly, the present invention is directed to a towel warmer that is retrofittable for use with an existing hot tub.

BACKGROUND OF THE INVENTION

Hot tubs have become more and more plentiful and have been added to existing home units as retrofit items themselves. Hot tubs are also frequently installed as options in new home construction as well. Their relaxing and therapeutic benefits are appreciated by a growing percentage of the population. They are being added along with the construction of exterior decks, sun porches, solariums and more. They can even be installed in their own separate housing units apart from one's main house structure.

In use, when a typical user leaves the hot tub, it is often desirable to wrap oneself as soon as is convenient, in a towel, bathrobe, garment or other material to be warmed. In colder climes, it is very desirable that the towel not be the same temperature as the air. However, many hot tubs, though not all, do not provide a mechanism for warming towels or other clothing material used to wrap around one's body. And even those hot tubs that do include such a facility may not include sufficient facilities for the desired number of towels or other garments. Accordingly, it is desirable to provide hot tubs with facilities and mechanisms for warming towels and other body coverings for use in conjunction with the use of the hot tub.

While one of the mechanisms for towel warming could be provided by an external electrical device, there are hazards associated with the use of electrical heating elements in conjunction with a human size container containing a potentially electrically conductive fluid. This is particularly true in the case of a towel heating mechanism that is provided in the form of a retrofitted device or kit, especially as opposed to a design that is already included by the manufacturer of the hot tub with the proper electrical connections and insulation in place as part of a "ground up" design. Furthermore, retrofittable towel warmers based on electrical resistance heating ignore the fact that there is already present a significant source of thermal energy, namely, the water in the hot tub itself.

Towel warmers per se are not new. They are often found provided in upscale hotels and resorts. Some hot tubs also already come equipped with towel warming mechanisms. For example, one such mechanism is illustrated in U.S. Pat. No. 6,175,970 issued to John Pinciaro on Jan. 23, 2001 and having a filing date of Sep. 13, 1999. Another such built-in design is shown in published U.S. Patent Application No. 2002/0129514 published on Sep. 19, 2002 and having been filed on Mar. 13, 2001. However, neither of these designs represents or describes a mechanism which is easily retrofitted to an already existing hot tub which has not already incorporated such a feature.

Accordingly, it is seen that there is a need for a towel warming mechanism that may be used in conjunction with a hot tub and, more particularly, in the form of a device or system that can be retrofitted to existing hot tubs in a convenient and easy fashion without the need for an electrical connection.

SUMMARY OF THE INVENTION

A towel warmer for use in conjunction with a hot tub comprises a flexible fluid conduit adapted for connection at a first end to a source of water at an elevated temperature from the hot tub together with a thermally conductive fluid conduit connected to the second end of the flexible fluid conduit. The thermally conductive conduit has a configuration which provides greater thermal contact area with said towel than a straight length of thermally conductive conduit. Lastly, there is provided a support for the thermally conductive fluid conduit which holds it so that the end thereof, which is not connected to the flexible conduit, is disposed so that water exiting therefrom is directable into the hot tub.

Put more briefly, the towel warmer comprises a flexible conduit which is in fluid communication with a thermally conductive conduit intended for contact with the towel or other material to be warmed. Finally, there is provided a support mast or pole for the thermally conductive conduit which ideally positions the unit so that water flowing through the two coupled conduits may be directed back into the hot tub. The mast structure may be either free standing or affixed to the tub or spa. If the thermally conductive conduit is also flexible, there is only a single conduit that is needed. At one end of the flexible conduit there is preferably disposed a mechanism for insertion, attaching or coupling into one of the jets in the hot tub. The unit may also be provided with an enclosure which surrounds towels being warmed by the device. Such enclosures hasten, protect and enhance the warming of the towels and maintains their higher temperature for a longer period of time than without their use.

In another embodiment of the present invention, a towel warmer comprises a hollow container for holding a material capable of storing thermal energy. Unlike the embodiment described above, this embodiment does not rely on a flow connection to the hot tub. However, like the above-described embodiment, this embodiment also relies upon thermal energy present in the tub water. In this embodiment, the container is shaped to provide a contact surface consistent with the shape of the item to be warmed, such as a towel, but also including other items such as bath robes and swim wear. The container may include such items as oil or any convenient material capable of absorbing thermal energy such as rocks, sand, pebbles. It may also include an opening, controlled or otherwise, for the inclusion of spa water itself. This embodiment may also be mounted on the mast used for the above-described embodiment.

As used herein, the term "hot tub" is meant to refer to any similarly named or constructed device, such as a spa, as long as it includes a human size container with warmed water directed into the container via jets of warmed water, with or without aeration (air entrained in the circulating water). Furthermore, while the present invention is described as a towel warmer, it may be used to add heat to any other convenient item that can be placed in thermal contact with the conductive conduit or portions thereof. For example, it may be used to warm swim wear or bath robes but is not limited in its use to any specific one or combination of these items.

It is therefore an object of the present invention to provide a towel warmer for use in conjunction with a hot tub.

It is also an object of the present invention to provide a warming mechanism for any convenient object that might be used in association with a hot tub.

It is yet another object of the present invention to provide a kit of parts that may be assembled for use with a hot tub as a warming device.

It is a still further object of the present invention to provide a mechanism with which a hot tub or similar device is proved with a towel warmer.

It is a yet further object of the present invention to provide a towel warmer for a hot tub without the need for electrical connections thereto.

It is yet another object of the present invention to provide a towel warmer that may be conveniently stored within the hot tub itself between uses.

It is also an object of the present invention to provide a towel warming mechanism which is conveniently storable within the hot tub itself, that is, within or in close proximity to the hot tub water and/or beneath any hot tub cover such as those intended to maintain water temperature by providing an insulative tub cover.

Lastly, but not limited hereto, it is an object of the present invention to provide an economical towel warmer for a hot tub, spa or similar device.

Additional features and advantages are realized through the techniques of the present invention. Other embodiments and aspects of the invention are described in detail herein and are also considered a part of the claimed invention.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 5A is a top plan view illustrating an embodiment in which the thermally conductive conduit is disposed in an A-frame structure, with or without an underlying support;

DETAILED DESCRIPTION

Figure 7:
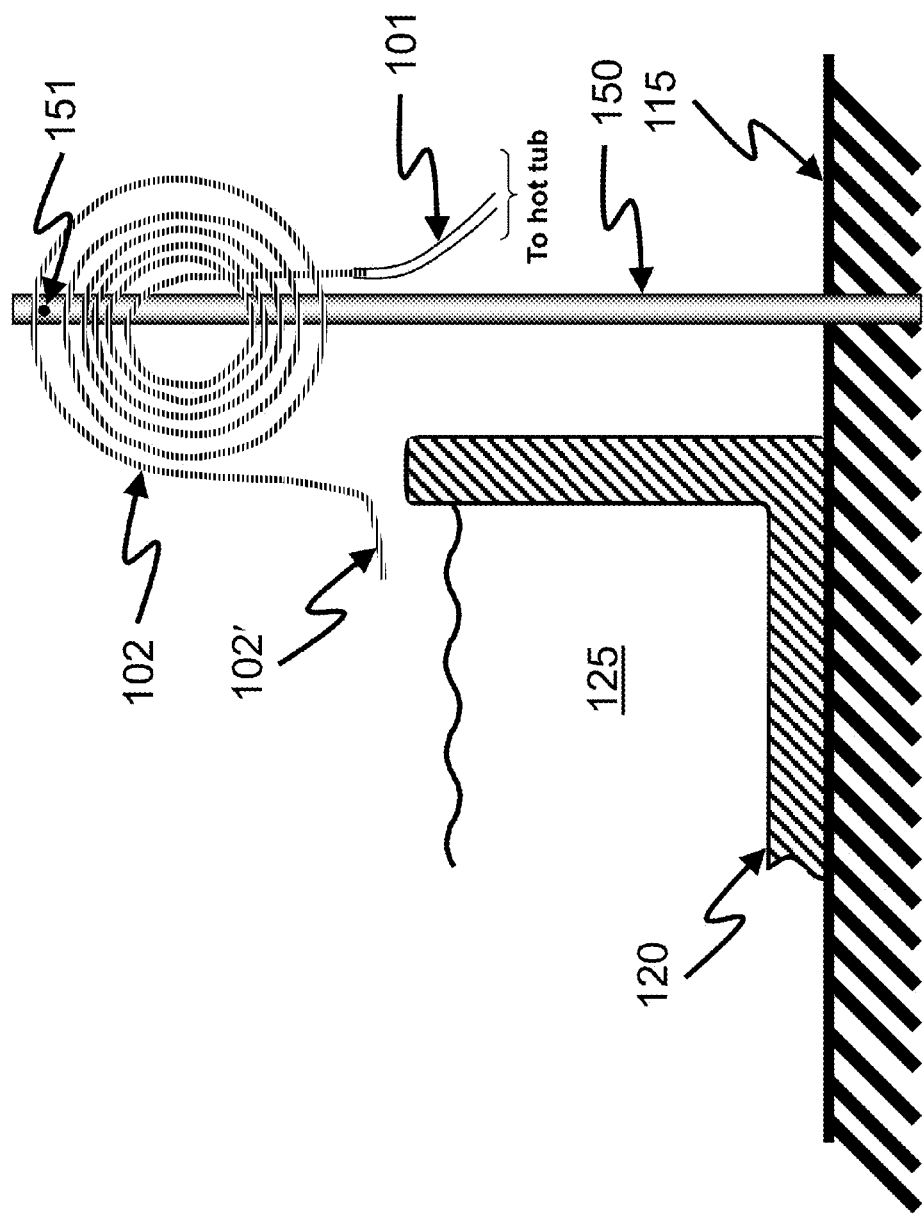
FIG. 7 is a partial cross-sectional view illustrating one embodiment of the present invention as well as the environment in which it is typically employed.
Figure 8:
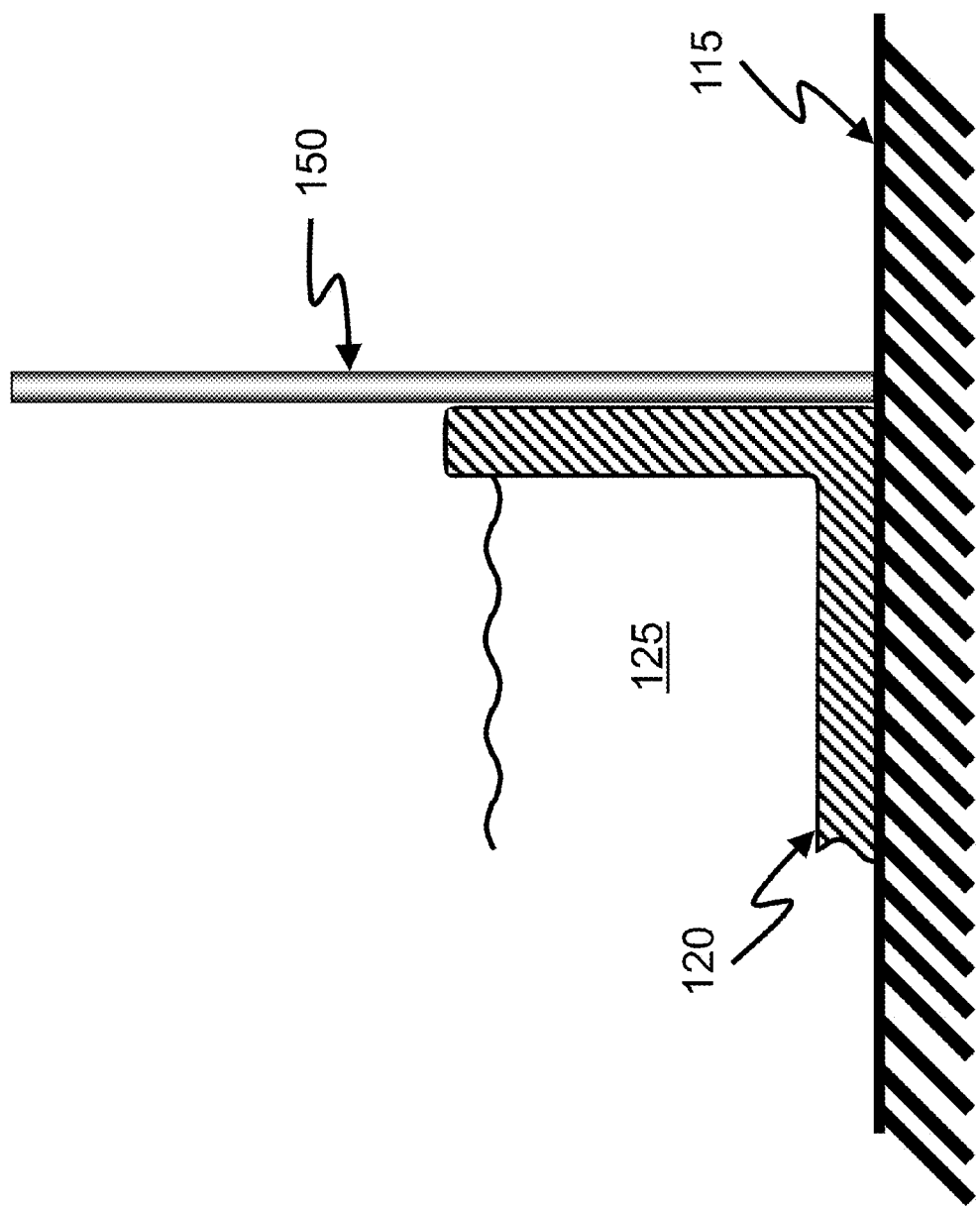
FIG. 8 is a view similar to FIG. 7 except more particularly illustrating an embodiment in which a supporting mast is affixed to the hot tub or spa.
Figure 9:
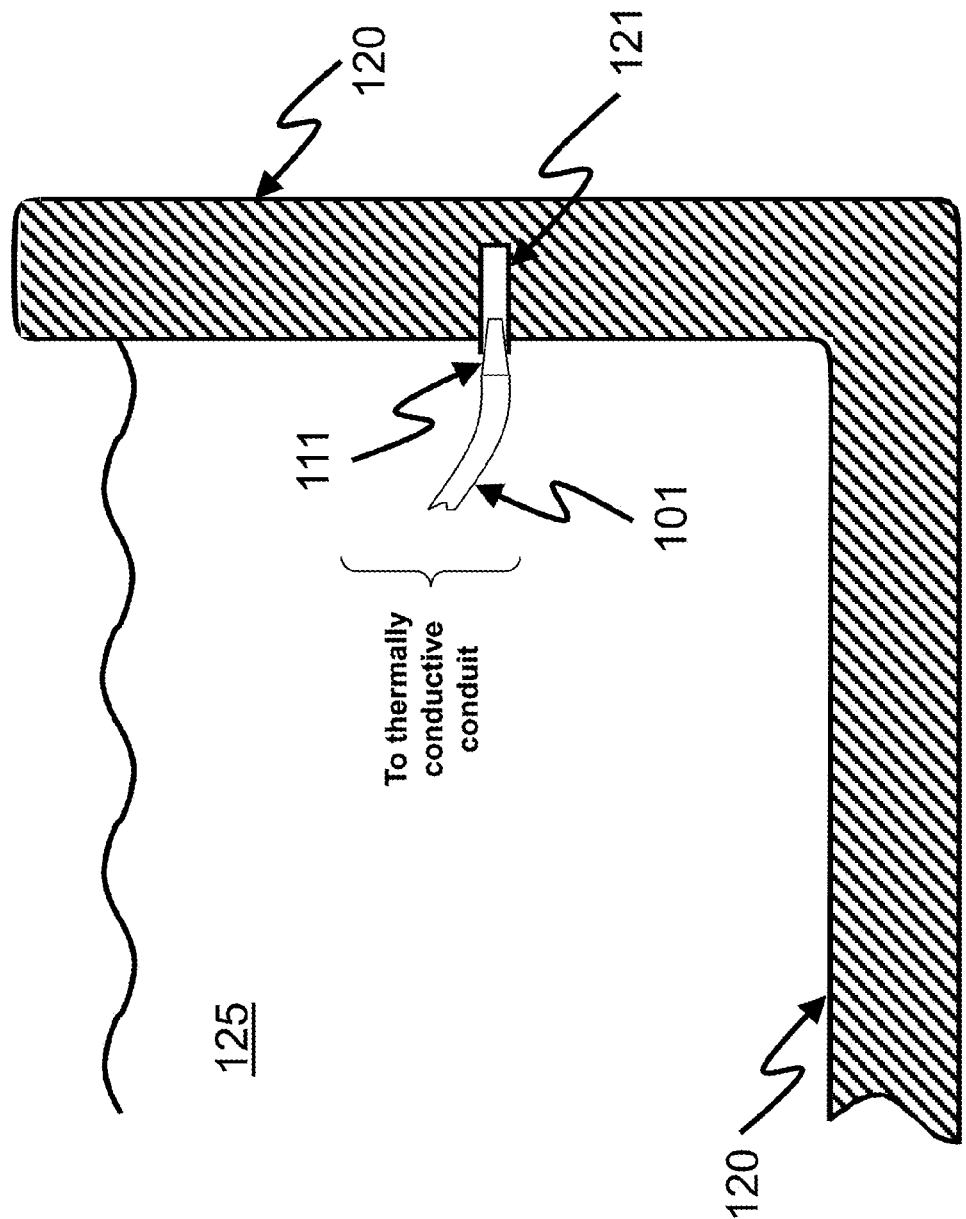
FIG. 9 is a partially cross-sectional view more particularly illustrating the coupling of the flexible conduit portion of the apparatus such as by the tapered insertion fitting shown in FIG. 1.
Figure 13:
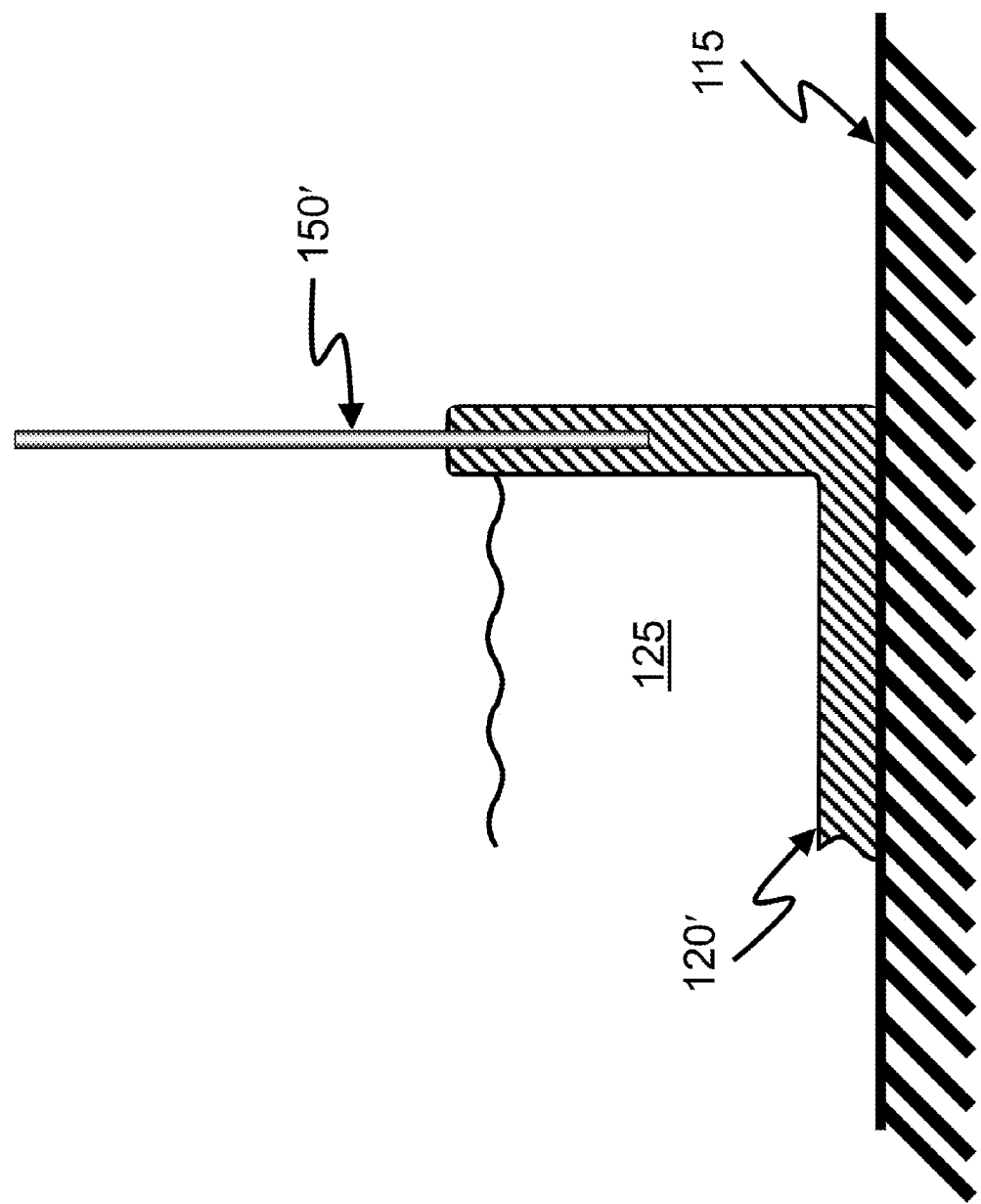
FIG. 13 is a partial cross-sectional view similar to FIG. 8 but more particularly illustrating a hot tub or spa specifically adapted to holding a mast which in turn supports a towel (or other material) warming apparatus.

A description of the present invention is best begun with consideration of FIG. 7 which illustrates but one embodiment. In particular, FIG. 7 shows hot tub or spa 120 containing water 125. Water 125 is heated by means not shown nor relevant to the construction or use of the present invention. Water 125 also has directed into it jets of water (see FIG. 9) driven by mechanisms that are also not relevant to the construction or use of the present invention. A towel warmer, as provided herein, is supported by mast 150. As shown in FIG. 7, mast 150 is disposed in the ground or floor 115 and may or may not be affixed or attached to hot tub or spa structure 120. Other mast locations are shown in FIGS. 8 and 13 as discussed in more detail below.

Mast 150 supports thermally conductive conduit 102 which preferably comprises a thermally conductive material conducting such as copper or aluminum. Thermally conductive conduit 102 may also comprise carbon fiber or even ceramic materials. Additionally, conduit 102 may also comprise jointed metal conduits such as those found on detachable hand-held bathtub shower devices. Hook, nail, strap, clip fastener or any other convenient supporting device 151 is employed to provide support for conduit 102 with respect to mast 150. While device 151 is shown positioned at an upper portion of mast 150, it is noted that its position is best chosen as a function of jet water pressure. For situations of lower water pressure from the spa jets, device 151 is preferably positioned lower on the mast which may be provided with a plurality of locations for device 151 or with a plurality of devices 151. It is clearly desirable that device 151 be positioned at an upper location on mast 150 so as to readily permit water to flow back into hot tub 120. FIG. 7 shows device 151 implemented as a nail. Thermally conductive conduit 102 is preferably sufficiently rigid to support an end 102' which extends over water 125. In operation water exits this portion of conduit 102 and is deposited into water 125. This may occur above the surface of water 125 or below it. FIG. 7 also illustrates the connection to flexible conduit 101. The flexibility of conduit 101 permits the assembly comprising conduits 101 and 102 to be disposed in an immersed position in water 125. This is convenient for hot tubs and spas which possess a cover for retaining heat between uses. The flexibility of conduit 101 is also convenient for the retrofitting capabilities of the present invention. Conduit 101 may comprise any convenient flexible material but polymeric materials and rubber materials are preferred.

Figure 10:
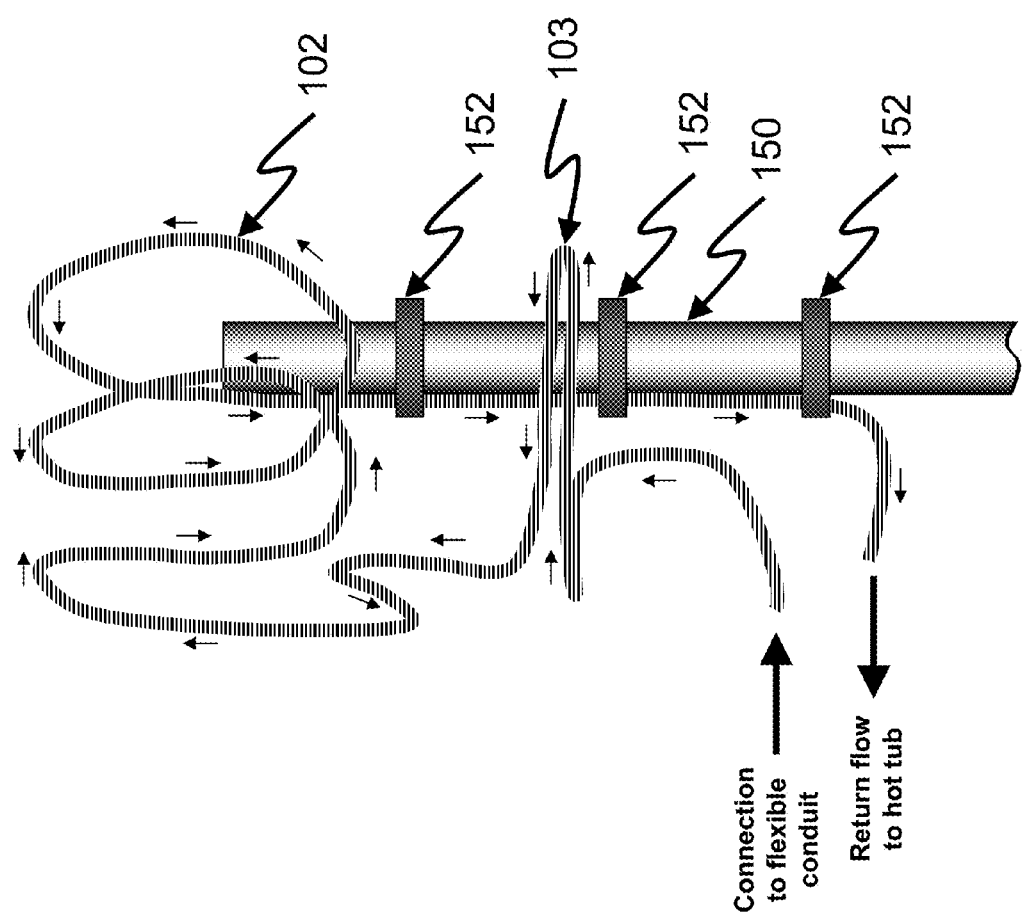
FIG. 10 is an isometric view of one embodiment of the present invention which more particularly illustrates a mast fastening mechanism together with the inclusion of a horizontal conduit portion for supporting a towel or like material as if placed on a table.

Thermally conductive conduit 102 is disposed in a configuration which provides greater contact with the material to be heated than would be provided by a linear section of conduit. For example, thermally conductive conduit 102 in FIG. 7 is provided in the form of a spiral coil. Such a coil is illustrated in more detail in FIG. 6. Other configurations are illustrated in FIGS. 5 and 10. For example, FIG. 10 illustrates an alternate embodiment of the invention in which thermally conductive conduit 102 is affixed to mast 150 by means of plastic straps 152 such as those that are conventionally employed to hold bundles of electrical wires together. A straight portion of thermally conductive conduit 102 extends upward along mast 150. At the top of mast 150, conduit 102 possesses a loop configuration which ultimately descends and forms circular horizontal portion 103 which conveniently acts as a table like structure for supporting material to be heated. Flow direction arrows are provided in FIG. 10 to more particularly bring out the shape of the structure which is shown in the isometric view. In general, flow direction is not critical for operation of the present invention.

Figure 5B:
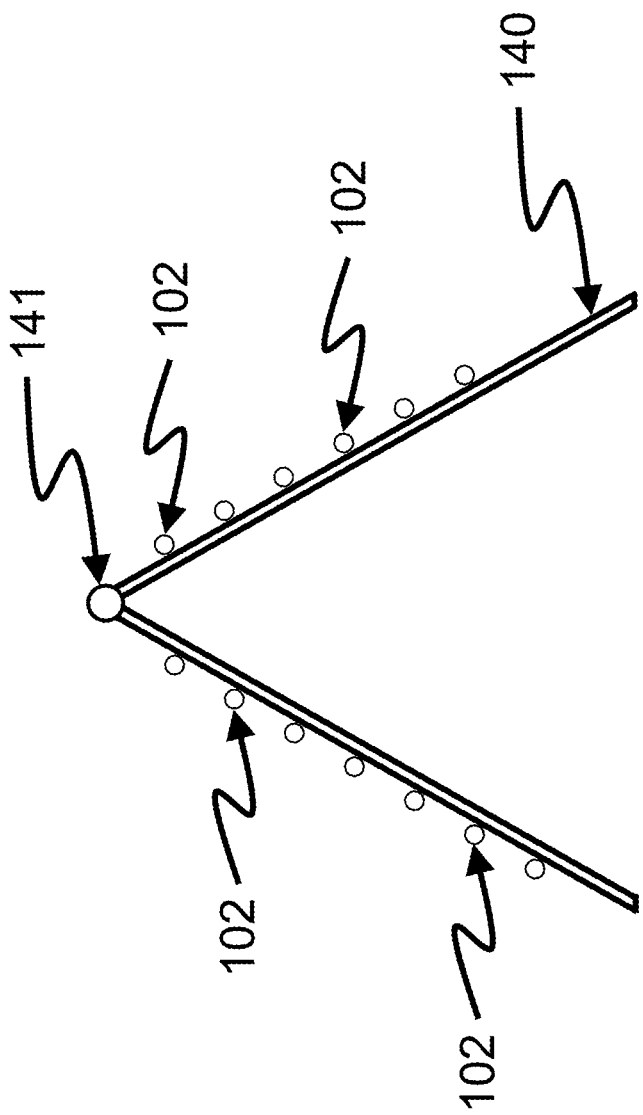
FIG. 5B is a side elevation view of the apparatus shown in FIG. 5A more particularly showing its A-frame structure.
Figure 6:
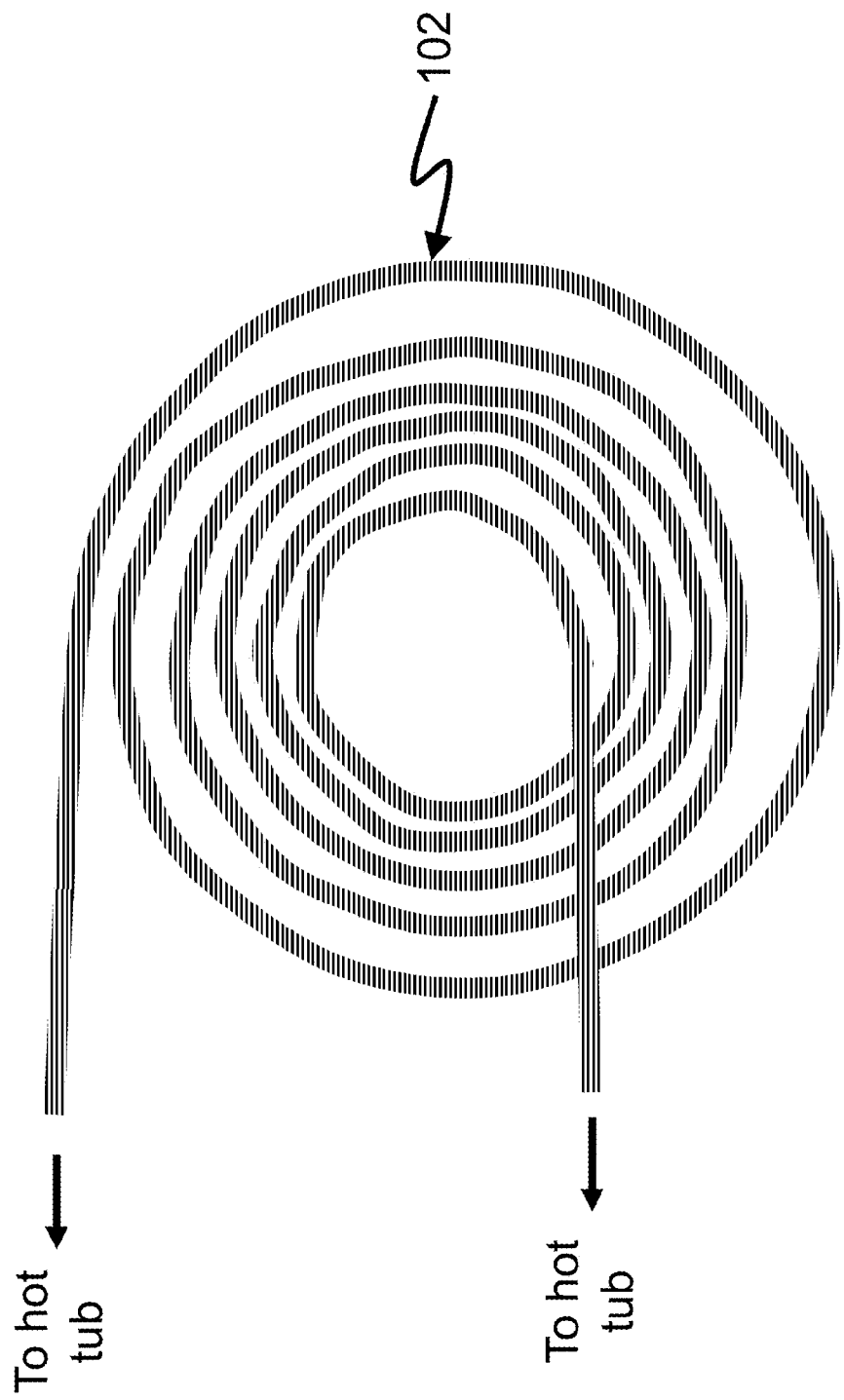
FIG. 6 is a top plan view illustrating one configuration, a coiled spiral, in which the thermally conductive conduit may be disposed, for example, as an alternative to the configurations shown in either FIG. 1 or 5.

As indicated above, thermally conductive conduit 102 is disposable in any convenient structure designed to provide greater contact area with a towel (or similar material). FIGS. 6 and 7 illustrate a flat coil structure. FIG. 10 illustrates a more complex structure including a loop and a horizontal circular portion (which could also be configured as a loop having more than a single circular portion; that is, horizontal portion 103 may also comprise a coil structure such as that shown in FIG. 6). An alternate structure for thermally conductive coil 102 is illustrated in FIG. 5 which includes FIG. 5A showing a top view of an A-frame conduit configuration which is more visible as such from the side view of same shown in FIG. 5B. For thermally conductive conduit materials comprising relatively flexible materials, it is possible to dispose thermally conductive conduit 102 on a support structure. Support structure 140 shown in FIGS. 5A and 5B is such a structure. To provide an A-frame configuration over which it is convenient to drape towels (or the like), support structure 140 is provided with hinge 141. It is noted, however, that any convenient support structure or conduit configuration may be provided. Thermally conductive conduit 102 is affixed to support 140 by any convenient means, including gluing, braids, U-bolts, plastic straps, ties, cords and the like. Support structure 140 preferably comprises a thermally conductive material which, like conduit 102, is capable of transferring thermal energy to towels (or the like).

Figure 1:
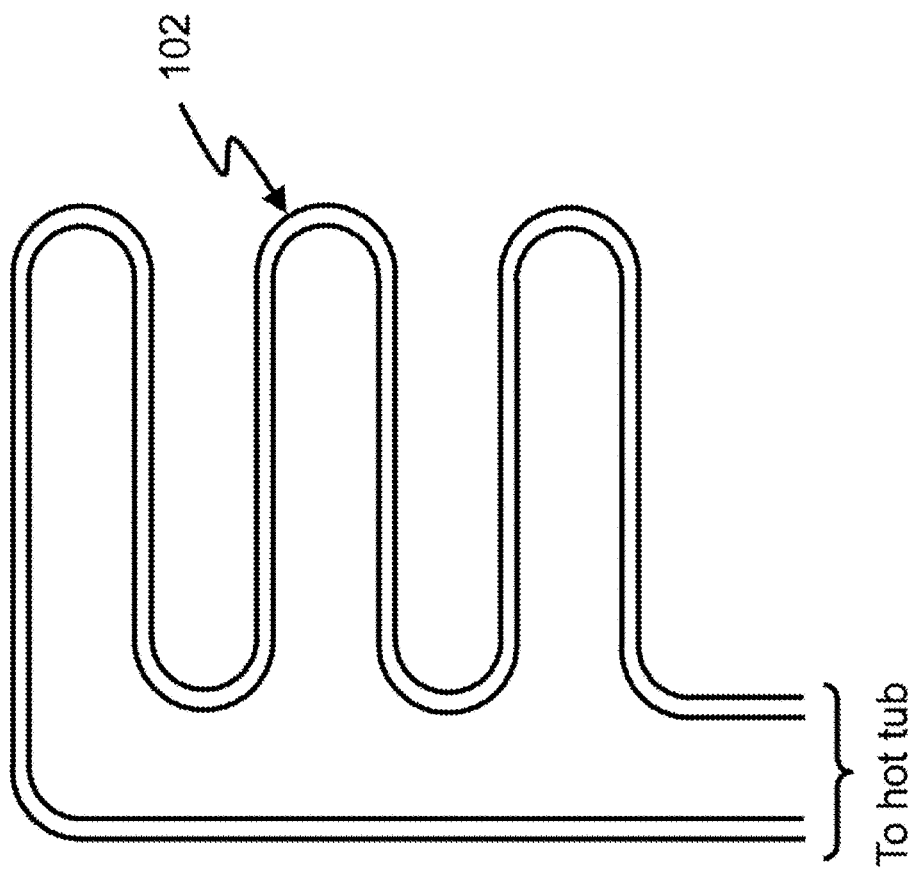
FIG. 1 is a plan view of a portion of a towel warmer particularly illustrating a possible configuration of a warmed conduit intended for contacting the towel or other material to be heated.

FIG. 1 also illustrates yet another configuration for conduit 102. It is also noted that conduit 102, or any portion thereof, may be disposed at least partially in the form of a helix (not shown). In fact any structure which enhances the surface area of thermally conductive conduit 102 may be employed. Thermally conductive conduit 102 may be disposed so as to wind back upon itself (as in FIG. 1) one or more times within a planar region (FIGS. 5, 6 and 7) or within a three-dimensional volume (FIGS. 5 and 10).

Figure 2:
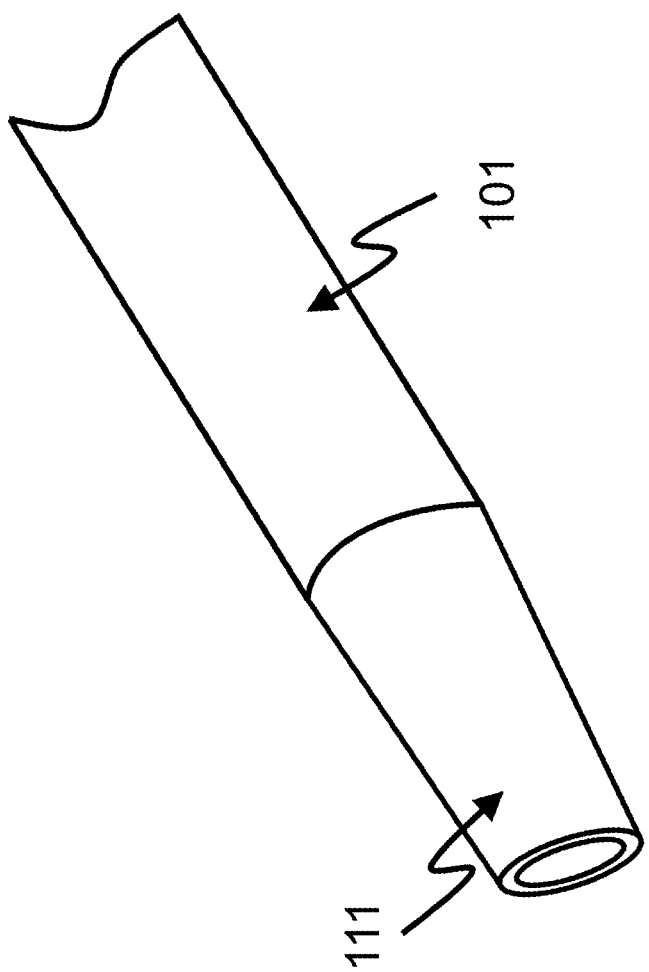
FIG. 2 is an isometric view illustrating one form of coupling that is especially useful for connection with existing hot tub water jets.
Figure 3:
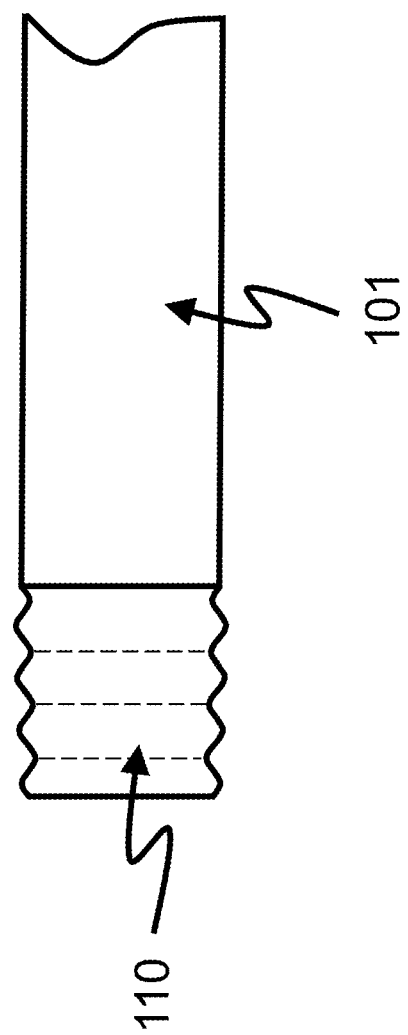
FIG. 3 is a side view of an alternate water coupling mechanism.
Figure 14:
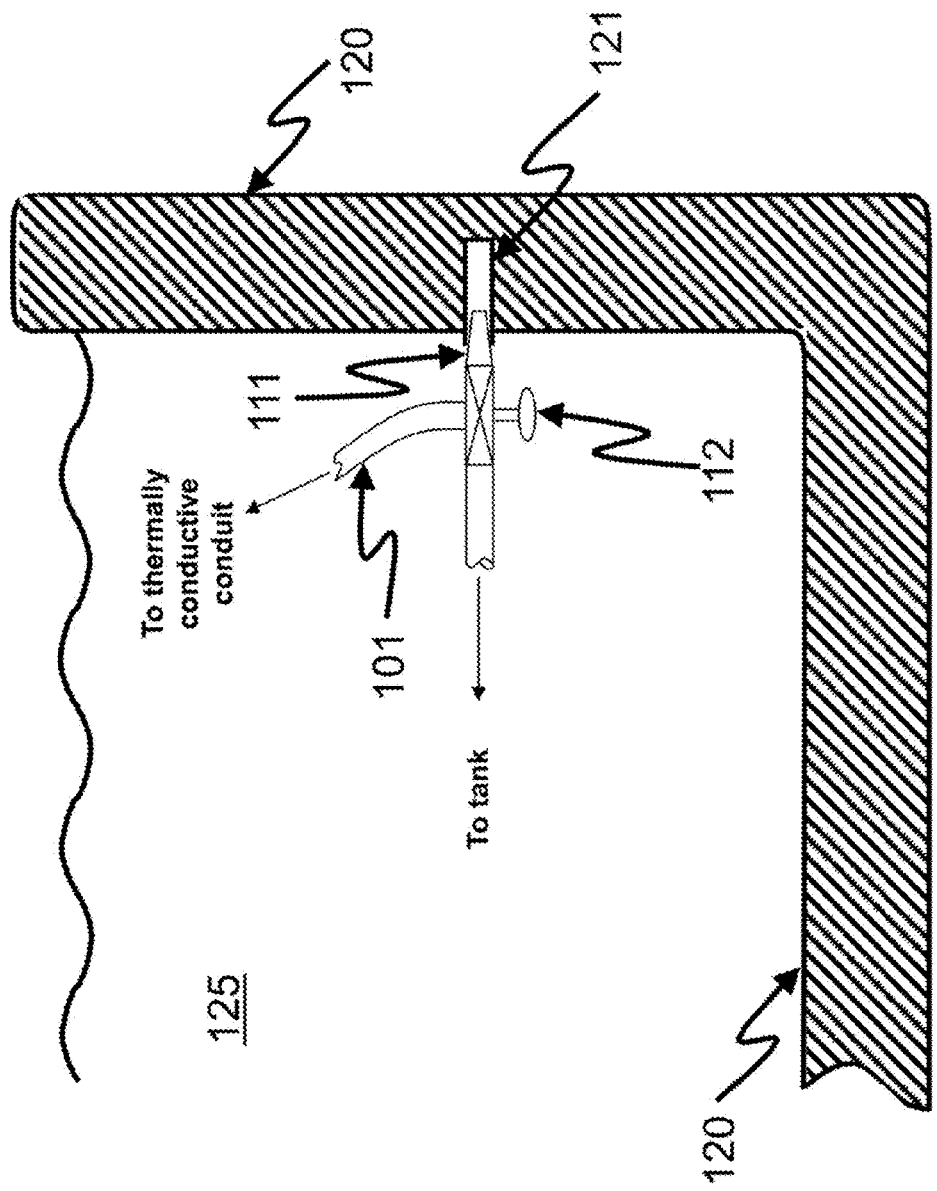
FIG. 14 is a view similar to FIG. 9 but more particularly showing the placement of a valve for controlling operation of the present invention.

FIG. 2 illustrates the preferred mechanism for coupling the present invention to an existing hot tub or spa. In particular, flexible conduit 101 is provided with a tapered end portion 111 which provides a friction fit into one of the water jets found in a hot tub or spa. See FIG. 9 in which tapered end 111 is shown inserted into existing water jet 121. For those hot tubs or spas which anticipate connections to be made to the tub water supply, there may be provided threaded, snap fit or quick release connections such as those present on a standard garden hose. In such cases, flexible conduit 101 may be provided with threaded end 110 such as that shown in FIG. 3. In embodiments of the present invention in which it is desired that the operation of the invention be turned off, valve 112 such as that shown in FIG. 14 is employed. This valve controls whether water from the spa jet is directed into the waters of the spa or into the conduits of the present invention.

Figure 4:
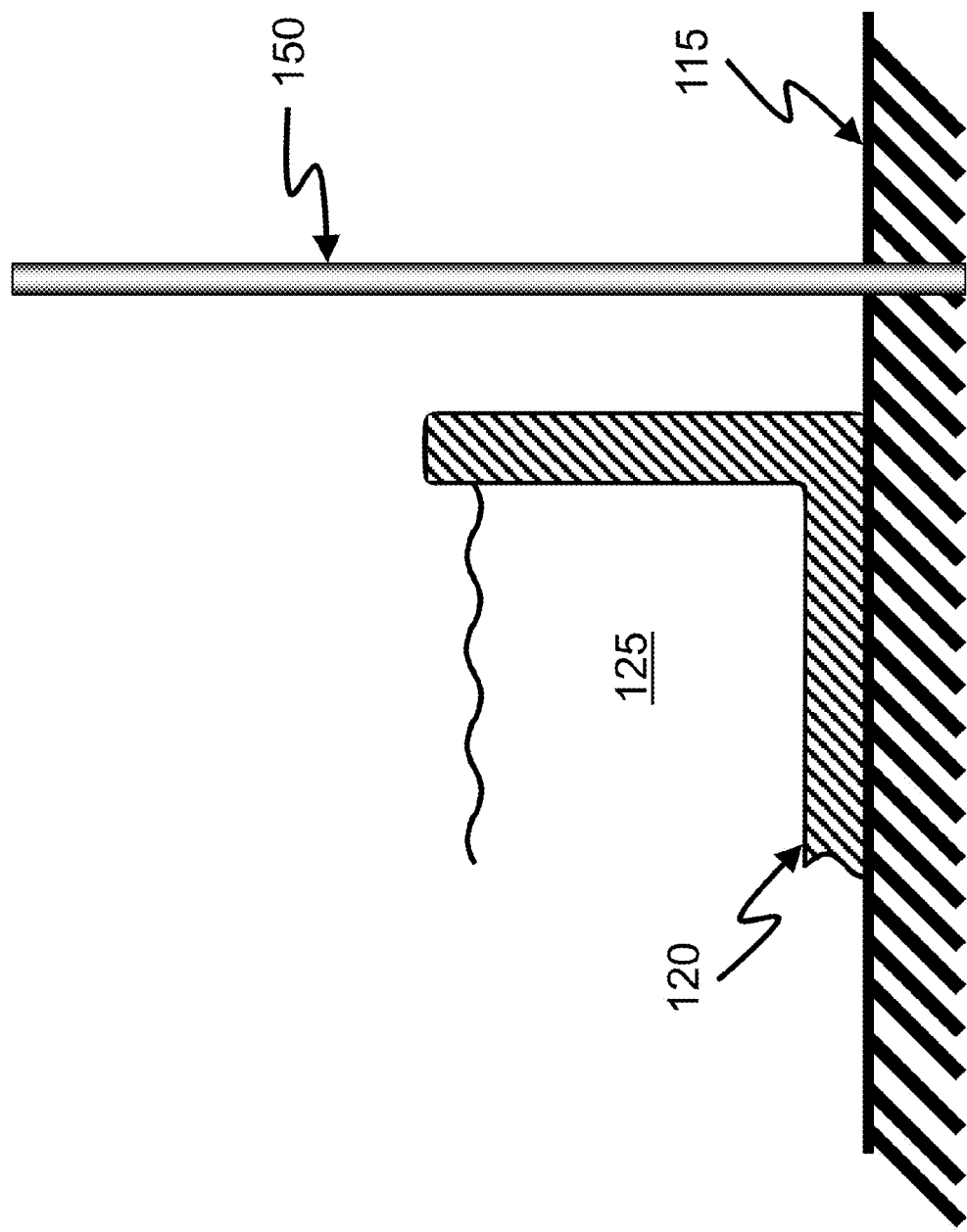
FIG. 4 is a side partially cross-sectional view illustrating one placement mechanism for a supporting mast for holding the towel warmer.

In various embodiments of the present invention mast 150 bears different relations with respect to hot tub or spa structure 120. For example, FIG. 4 illustrates an embodiment in which mast 150 is disposed entirely separate and apart from spa or hot tub 120. It is in this embodiment that the retrofittable characteristics of the present invention are most apparent. In this embodiment, mast 150 is disposed within an opening in floor or ground or placed in a base affixed or positioned next to the spa or hot tub 115. Any other convenient mechanism for affixing mast 150 to ground or floor 115 may also be provided, other than by the illustrated insertion into an opening.

FIG. 8 illustrates another embodiment in which mast 150 is affixed to a side of hot tub or spa 120. Again affixation is by any convenient mechanism such as ties, straps, clamps, U-bolts, slots, or the like. This embodiment represents the next degree in relative ease of retrofitting the present invention. In circumstances in which openings are already present in spa or hot tub 120, an arrangement such as that shown in FIG. 13 is employed. Such openings are ideally provided by tub or spa manufacturers in anticipation of providing logistical support for masts which actually may have been or are intended for other uses, such as supporting a garment hook or hanger. In non-ideal situations, with care, such an opening may be provided in tub or spa 120. However, this is the least convenient mechanism, vis-à-vis retrofittability. In these circumstances, mast may be shorter than otherwise, as shown by mast 150' in FIG. 13.

In FIGS. 7 and 10 it is noted that the present invention may be enhanced by the addition of an insulation material around it (not shown), such as in the form of a wide hood, which is thrown over or disposed around at least a portion of thermally conductive conduit 102. This material preferably comprises materials that are known for reflecting radiation at infrared energy frequencies. Such materials are conventionally employed in so-called "space blankets." Alternatively, any convenient enclosure partially or wholly surrounding thermally conductive conduit 102 may be provided. It may or may not be rigid but is preferably supported directly by mast 150.

Figure 11:
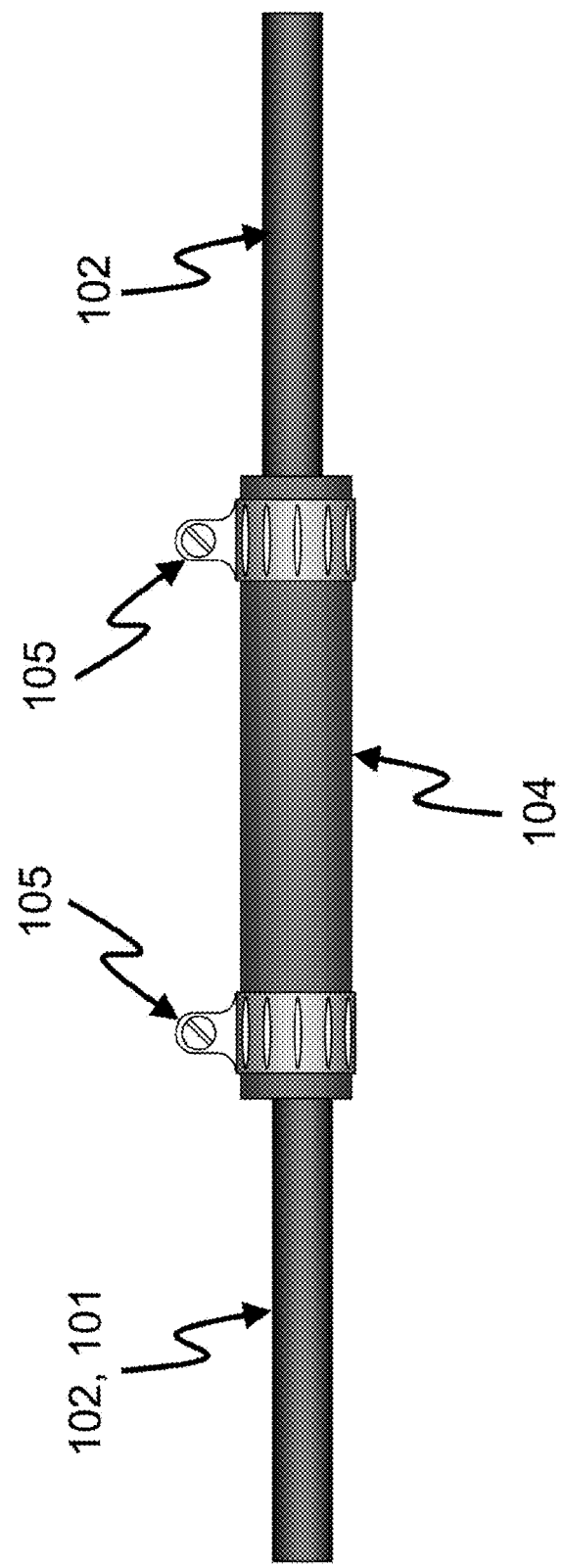
FIG. 11 is a side elevation view of a coupling mechanism that may be employed between the nominally flexible and the thermally conductive portions of the apparatus as well as between segments of the device when structured as a kit for assembly.

It is noted that the present invention may be packaged and deployed as a kit of parts to be assembled by existing hot tub owners or which may be supplied in the future by hot tub developers and manufacturers. For example, the difficulty of packing and shipping a device having the relatively large volume occupied by the embodiment shown in FIG. 10 may be ameliorated by providing the apparatus, particularly the rigid thermally conductive portion, in sections which are easily assembled on site. The rigid thermally conductive portion may be provided in sections that lie relatively flat in a package but which are joined together by the use of a connection such as that shown in FIG. 11. Therein is shown a friction fit conduit portion 104, such as a section of hose, affixed to conduits 101 or 102 by hose clamps 105. Such an arrangement is the preferable mechanism for attaching flexible conduit 101 to thermally conductive conduit 102. This is an alternative to the friction fit between conduits 101 and 102 shown in FIG. 7. When packaged as a kit which includes connection assemblies such as that shown in FIG. 11, mast 150 is preferably supplied as a set of two or three mating sections which are joined end to end to provide a mast of desired height. Alternatively, in such circumstances mast 150 may be provided as a telescoping device with appropriately spaced snap locks or the twist locks or the like, as are conventionally found on tripods, especially those for supporting photographic equipment. With respect to making the present invention more compact (either for user convenience or for packing and/or shipping), in addition to making the mast telescopic it is also possible to make conduit 102 out of an expandable material akin to a corrugated vacuum cleaner or radiator hose.

Figure 12:
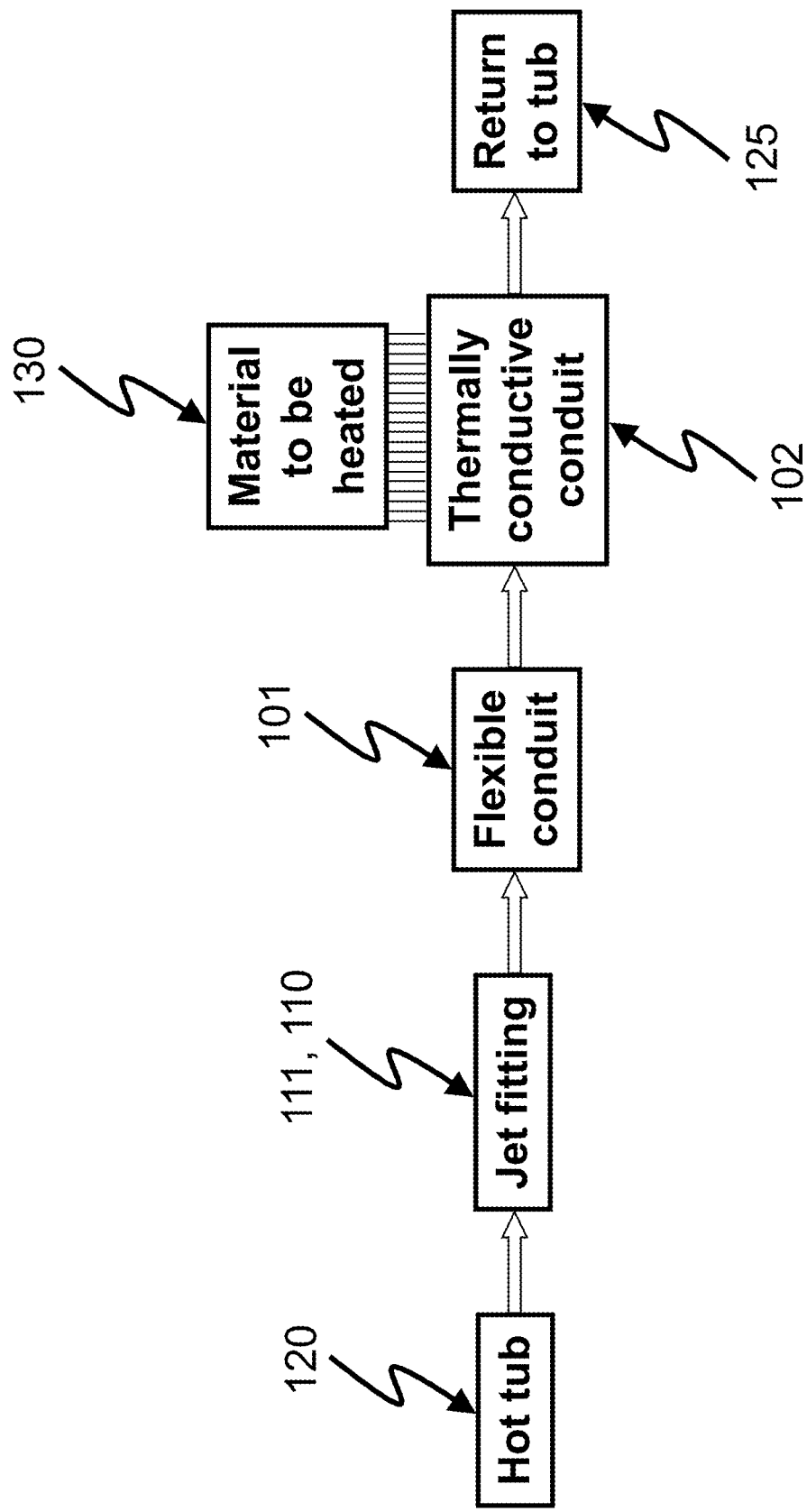
FIG. 12 is a block diagram view illustrating the systemic aspects of the present invention.
Figure 24:
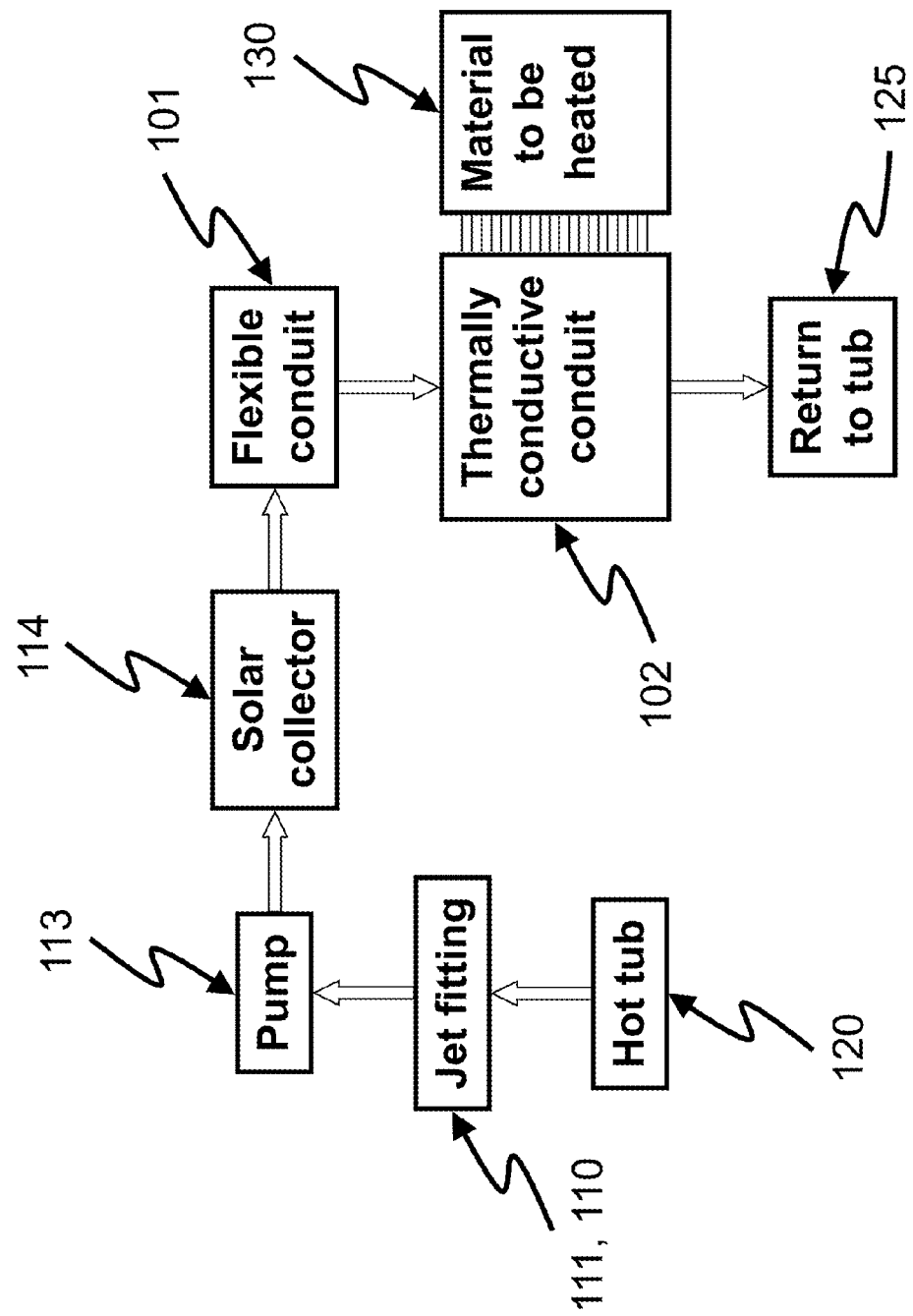
FIG. 24 is similar to FIG. 12 but includes other embodiments, particularly those related to the use of a pump for circulation and the use of a solar heater/collector.

FIG. 12 illustrates in a block diagram format the overall structure of the present invention. In particular, FIG. 12 illustrates the intended thermally conductive connection (as suggested by the set of 20 parallel lines) between thermally conductive conduit 102 and object or material 130 to be heated. FIG. 24 is similar to FIG. 12 but includes other embodiments, particularly those related to the use of a pump for circulation and the use of a solar heater/collector.

Figure 15:
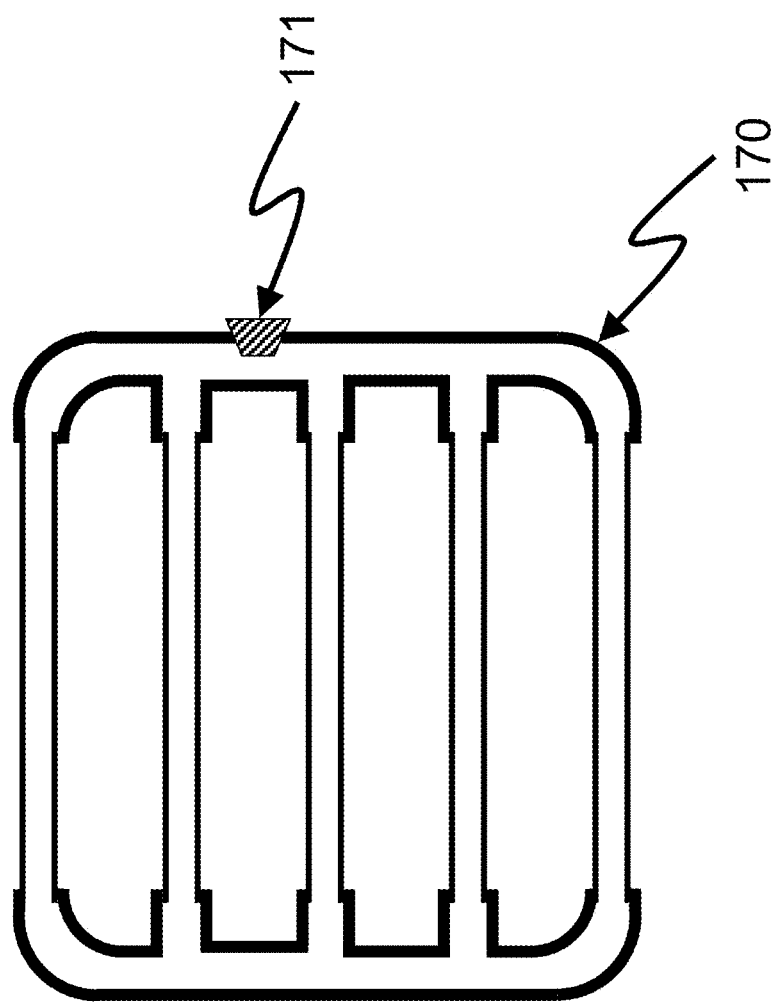
FIG. 15 is a cross-sectional side view of an embodiment of the present invention in which there is no continuous flow connection with the water in a hot tub.

An embodiment of the present invention in which a continuous supply of hot tub or spa water is not required is shown in cross-sectional view in FIG. 15. Therein is shown a configuration for container 170 for holding a medium which is capable of absorbing and conducting thermal energy to a cloth item which is to be warmed. Any convenient medium may be used for this purpose including already heated (the) spa water itself. However, gels or oil may be used, even such an oil as peanut oil. Rocks, pebbles or sand may also be used for this purpose. If spa water is employed plug 171 is provided. Plug 171 may also be used for adding oil or sand to the container. Larger material such as rocks are more conveniently added before assembly. Combinations of fluids, sand, rocks or pebbles may also be employed. While plug 171 is shown, it is also possible to provide this flow communication mechanism with a valve such as valve 112 such as shown in FIG. 14. Plug 171 is also not limited to the force fit sealing mechanism shown; rather, it is noted that a screw cap may also be employed. Clearly, more than one aperture into container 170 may be provided.

The container comprises any convenient thermally conductive material but may also comprise a plastic material such as PVC piping. The container has any shape which is convenient for enhancing the contact surface with a towel or garment to be warmed. While the figure shows container 170 as having multiple passages, it is noted that the invention may also be provided in the form of a container having a single passage or one in which there is but a single chamber. In any event, this embodiment of the invention is also provided with a hook or loop for attachment to the aforementioned mast. In the case of the embodiment shown in FIG. 15, the presence of multiple passages by itself provides sufficient structure for hanging it on the mast.

Figure 16:
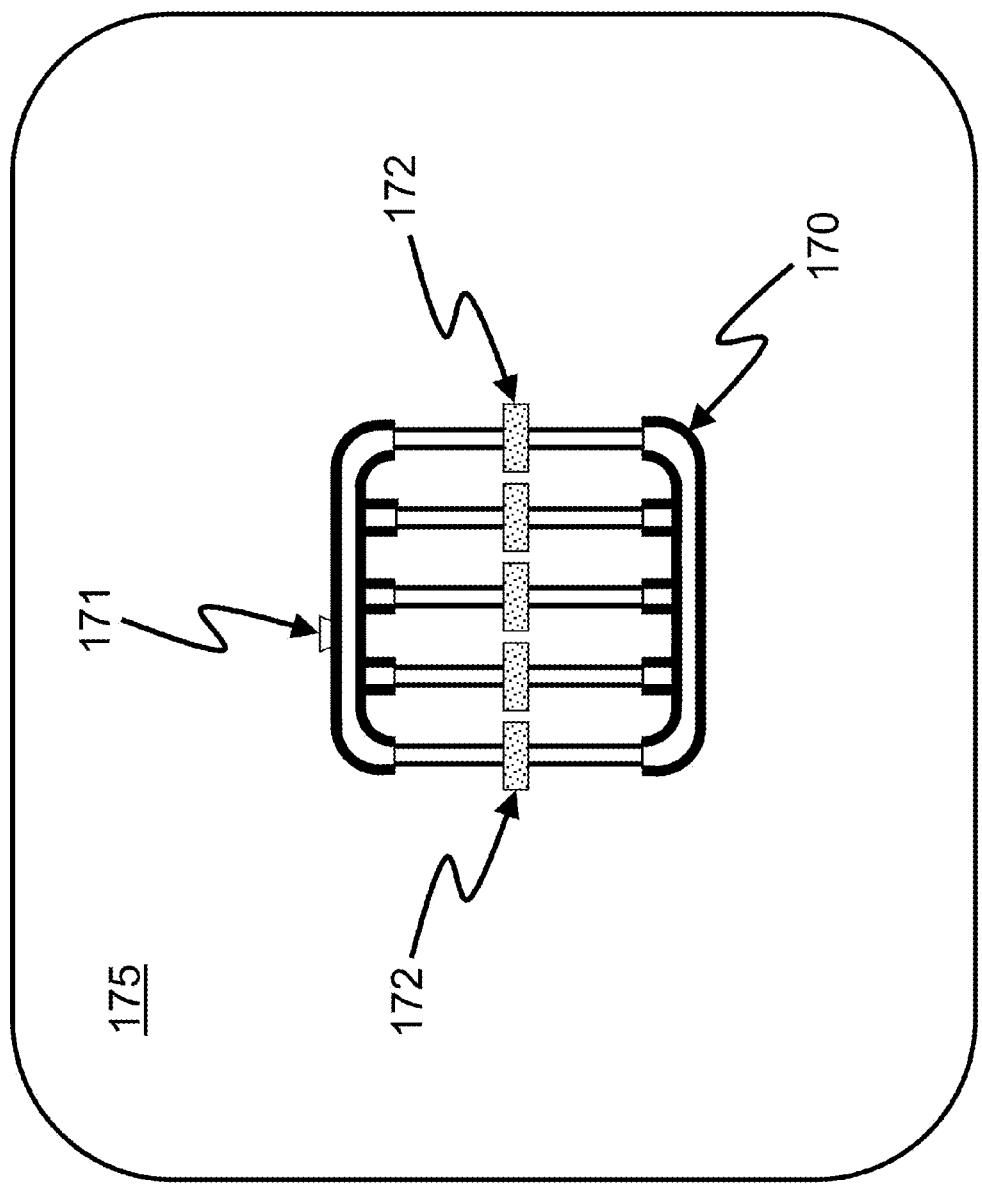
FIG. 16 is a bottom plan view showing storage of one or both of the embodiments herein against the underside of a tub or spa cover.

FIG. 16 illustrates one method for storage of the present invention. In particular, container 170 may be affixed to the bottom side of spa cover 175. A convenient mechanism for this purpose is the use of Velcro or Velcro like fasteners 172. Such a mechanism is also usable for storage of coil 102 in FIG. 6. Likewise, it is noted that mast 150 may also be attached to the side of spa, tub or pool 120 through the use of adhesive coated Velcro strips.

In operation, the embodiment shown in FIGS. 15 and 16 is immersed in hot spa water prior to use. As with the first mentioned embodiment, this embodiment is also conveniently stored already immersed in the water so that, when the water reaches its desired temperature, the warmer is also ready to be used. Naturally, the exterior surface of the warmer does not include materials which have a propensity to absorb water. This embodiment, like the first described one, may also be provided in kit form. The passages shown in FIGS. 15 and 16 may be provided separately and either glued, screwed or clamped together to produce the structure shown.

Figure 17:
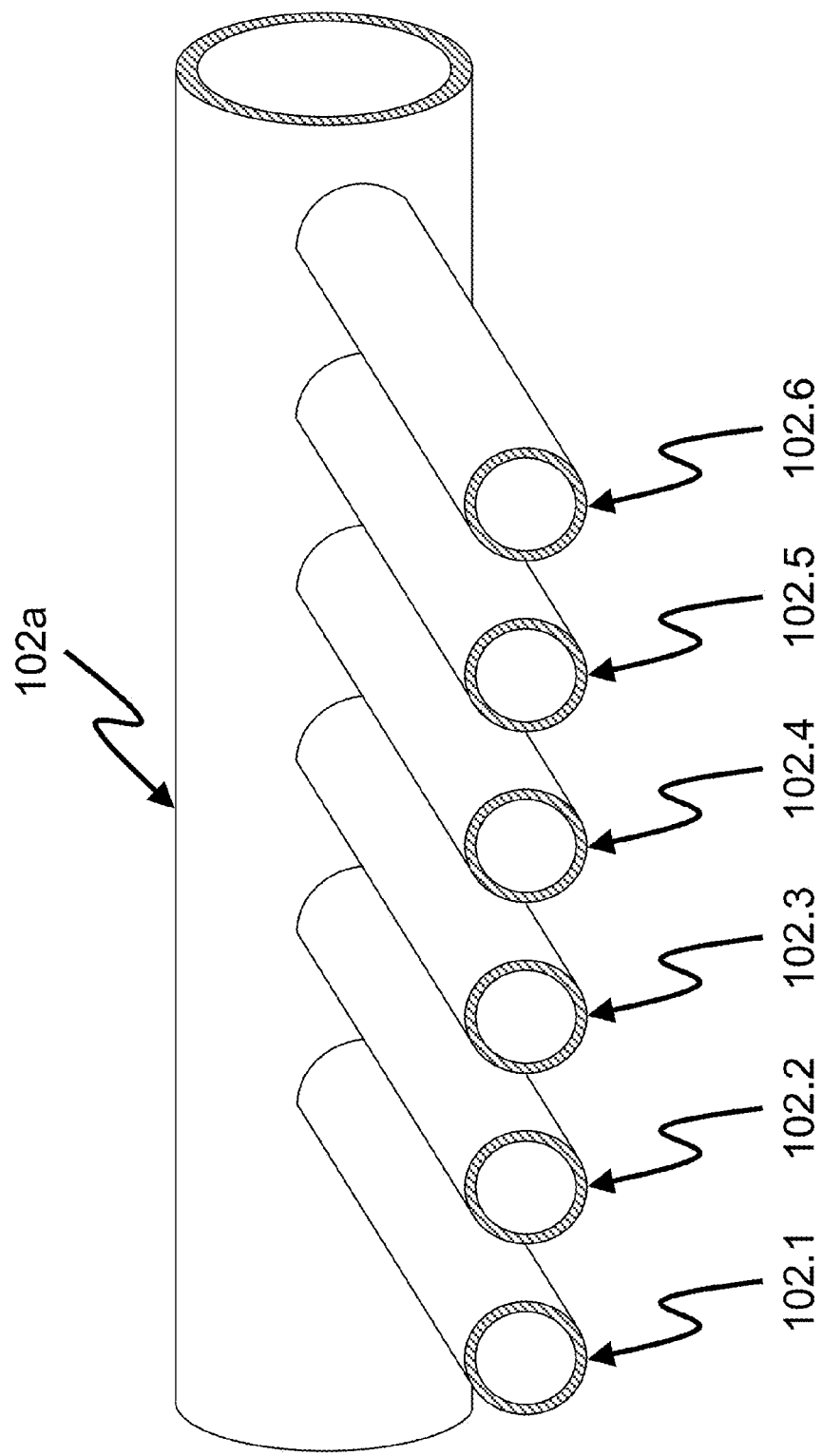
FIG. 17 is an isometric view illustrating an embodiment of the present invention in which a thermally conductive conduit portion comprises a plurality of conduits fed from a single manifold.

While the present invention may employ a thermally conductive conduit (102) disposed in a serpentine or coiled configuration, it is also possible to provide parallel flow paths such as is shown in FIG. 17. In this embodiment, manifold 102*a* is provided with heated water 125 from spa vessel 120 such as from flexible conduit 101. Manifold 102*a* feeds thermally conductive conduits 102.1 through 102.6. These conduits supply a fluid path to a matching manifold (not shown due to its similarity to already shown manifold 102*a*). While six conduits are shown any practical number may be employed.

Figure 18:
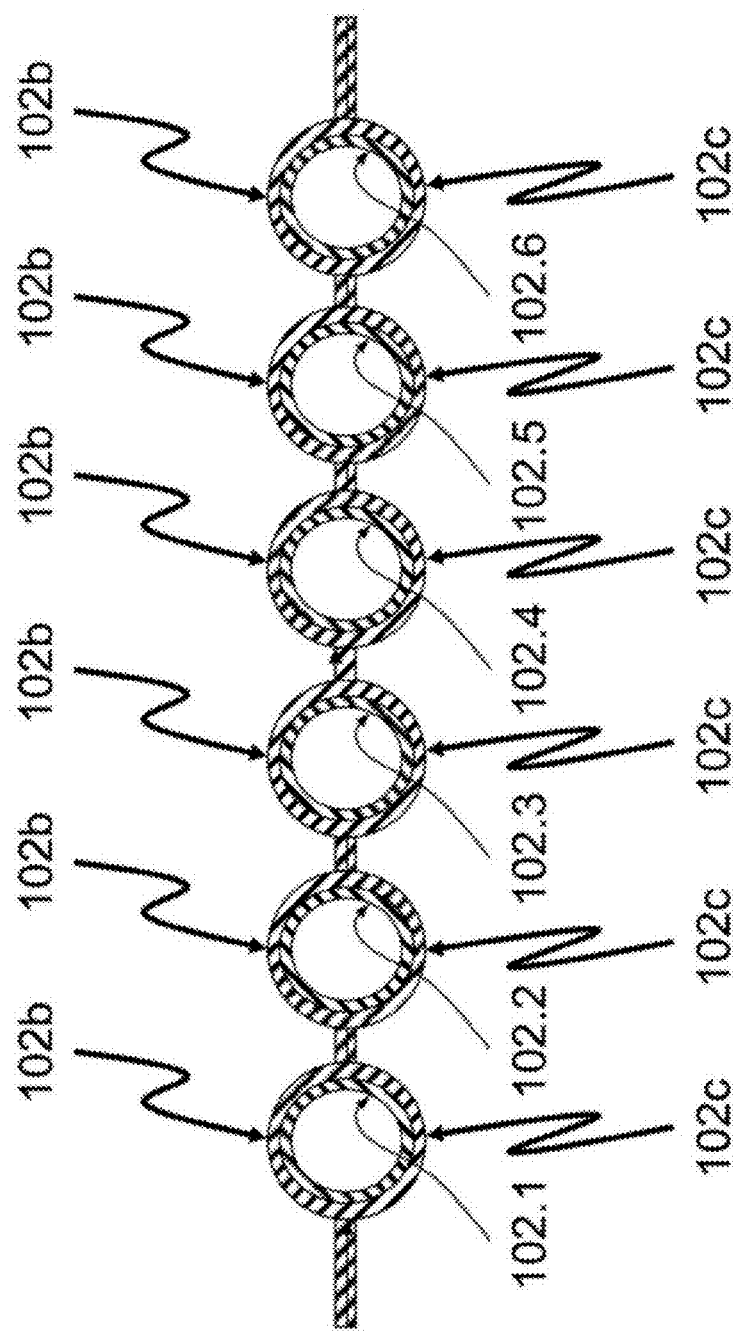
FIG. 18 is a cross-sectional side elevation view illustrating one method in which parallel flow, thermally conductive conduits may be formed or structured.

FIG. 18 illustrates the same parallel flow configuration as is shown in FIG. 17 except that here the structures are formed differently. This both illustrates an alternative method of constructing the present invention and a structure that is more apt to be purchasable as an off-the-shelf component. In particular, individual thermally conductive conduits 102.1 through 102.6 may comprise a metal such as copper, aluminum or steel (especially stainless steel). These conduits are held in place by shaped upper conductive layer 102b and correspondingly shaped lower layer 102c. Layers 102 b and 102c preferably comprise a compatible thermally conductive material. By "compatible" is meant one that does not result in the contact of dissimilar metals. Layers 102b and 102c not only provide a mechanism for holding conduits 102.1 through 102.6 in place, they also provide an enhanced area for the transfer of thermal energy to the object or objects to be heated (by contact or otherwise).

Figure 19:
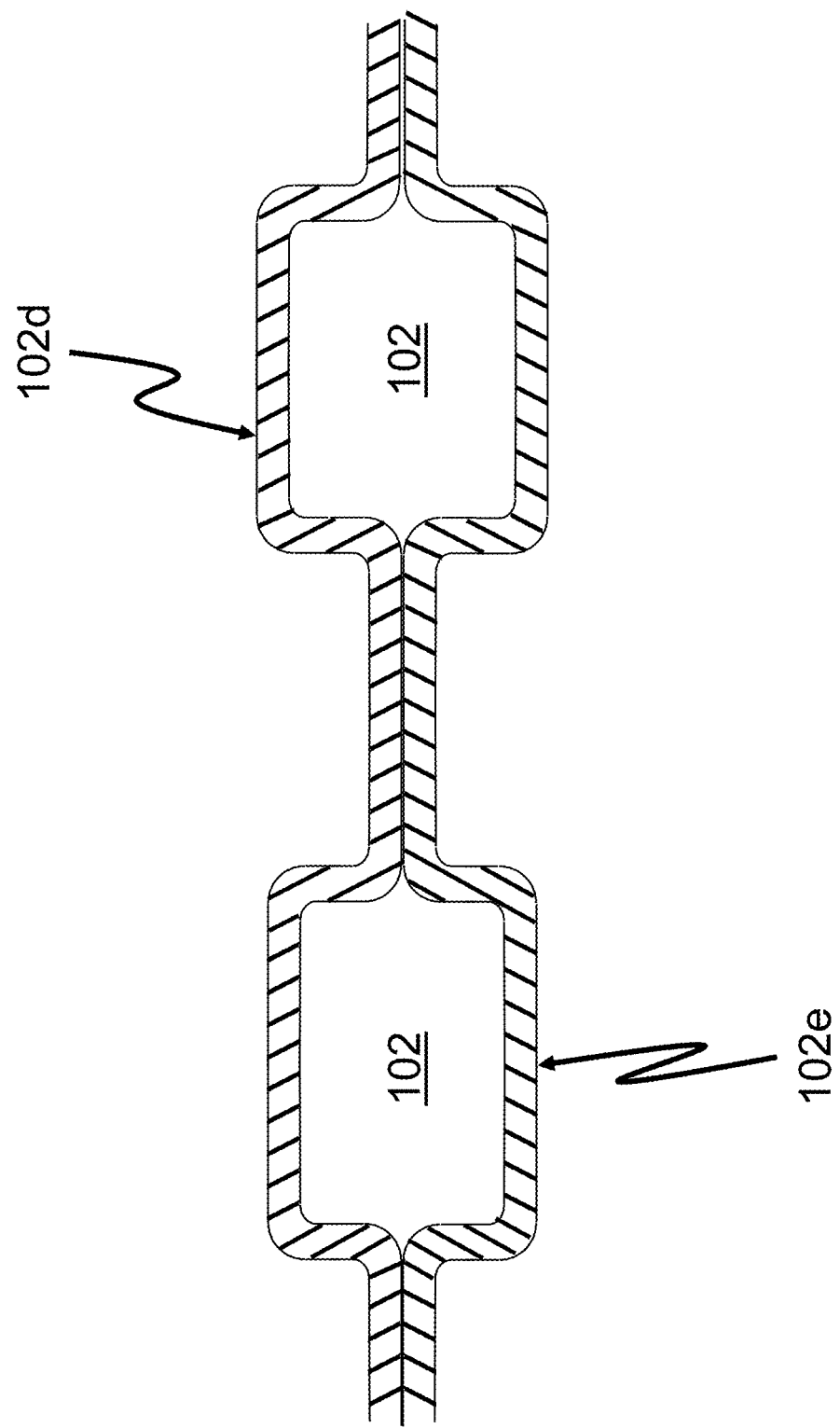
FIG. 19 is a cross-sectional side elevation view illustrating one method for forming a large surface area, thermally conductive set of conduits for warming a cloth garment or fabric.

FIG. 19 illustrates a variation on the structure show in FIG. 18. In FIG. 19, thermally conductive conduits 102 are provided in parallel by joining together two mirror image sheets of metal, as by welding along a seem where the surfaces meet. This provides a convenient method of manufacture while at the same time provides a relatively flat are for high thermal conduction and contact with material to be heated. Two sheets 102d and 102e are joined together to meet these two objectives.

Figure 20:
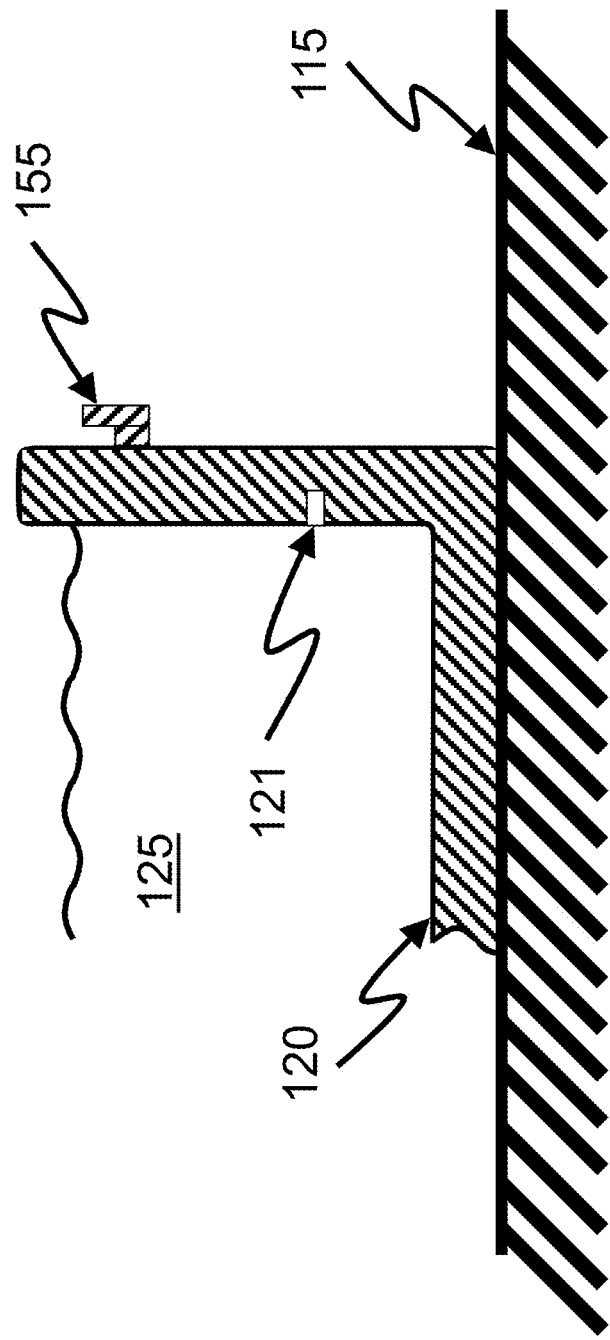
FIG. 20 is a side elevation view of a hot tub or spa illustrating an alternative mechanism to a mast for support.
Figure 21:
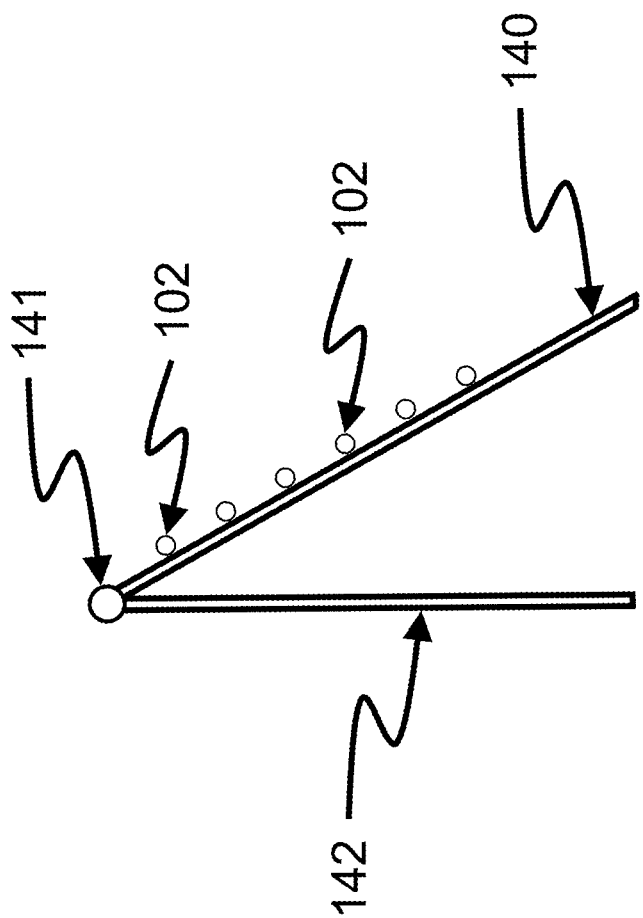
FIG. 21 is a side elevation view illustrating a structure similar to the structure shown in FIGS. 5A and 5B, but more particularly showing a structure which could be hung on the side of a hot tub or spa using the device shown in FIG. 20.

FIG. 20 illustrates the inclusion of a hook, peg, loop or other hanging mechanism 155 which may be provided with a spa or hot tub as sold or which may be added as an after-market item which may be affixed to the tub or spa by nails, screws, adhesives or any other convenient mechanism. Hanging device 155 may also be used to support a variation of the conductive coils as shown in FIG. 21. In this configuration the thermally conductive portion of the device is provided on front support 140 which is hinged to back support 142. Hinge 141 may also comprise an angularly fixed connection between front support 140 and back support 142 which may be provided with an aperture therein through which hook 155 is disposed.

Figure 22:
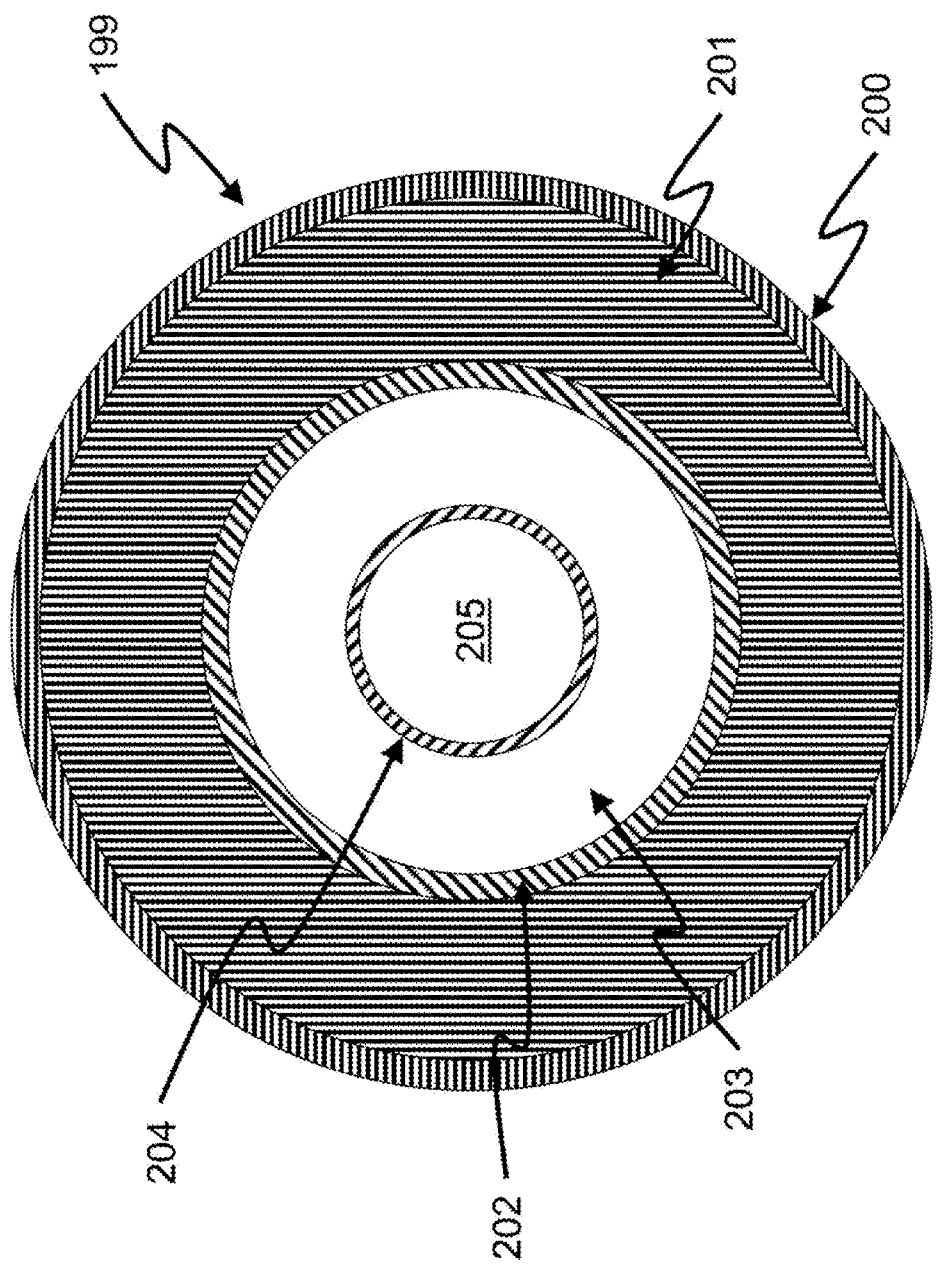
FIG. 22 is a cross-sectional end view of a device in accordance with the present invention which makes use of the ability of a sealed container holding a garment to provide thermal contact with warmed spa water directly, as by immersion therein.

In another embodiment of the present invention, a towel warmer comprises a hollow container for holding a material capable of storing thermal energy. A cross-sectional view through one such embodiment is shown in FIG. 22. Unlike some of the other embodiments described above, this embodiment does not rely on a flow connection to a hot tub or spa. However, like the above-described embodiments, this embodiment also relies upon the thermal energy present in the tub water. In this embodiment, the container is shaped to provide a contact surface consistent with the shape of the item to be warmed, such as a towel, but also including other items such as bath robes and swim wear. The container may include such items as oil, of any convenient variety, rocks or may even have an opening for the passage of spa water itself. This embodiment may also be mounted on the mast used for the above-described embodiment or hung on the side of the tub for convenience. The container is dimensioned and weighted to maintain, especially when containing the material to be warmed, a floating position just below the surface of water 125. This provides convenience while at the same time providing maximal contact with the heated water. In general, however, the container may be found floating on top of the water, at the bottom of the hot tub or, as indicated, just below the surface.

In one embodiment the warmer comprises a cylindrical structure having a cylindrical cross-section such as that shown in FIG. 22. However, flat configurations are also employable. Material to be warmed is placed in volume 201 contained between outer thermally conductive sleeve 200 and intermediate thermally conductive sleeve 202. Volume 203 is defined by intermediate thermally conductive sleeve 202 and interior thermally conductive sleeve 204. Innermost sleeve 204 provides a passage for heated spa or tub water. In operation, the object or material to be warmed is placed within volume 201, the container is sealed and the entire apparatus is placed in water 125. Volume 203 contains a thermally absorptive material such as sand or oil. Material in volume 203 is heated by the passage of spa water through passage 205. Sleeves 200 and 204 may also comprise flexible material so that water pressure assures a closer thermal contact between the heated spa water and the material to be heated. In this embodiment, the container is preferably ballasted to lie at the bottom of spa water 125, in which case a retrieval string, cord or rope is provided for easy retrieval. It is also possible to provide container 199 (FIG. 22) in the form of a sealable, flexible, ballasted plastic bag, again preferably with an aperture for a retrieval rope. The bag preferably has the same substantial shape as the cloth article to be warmed.

Figure 23:
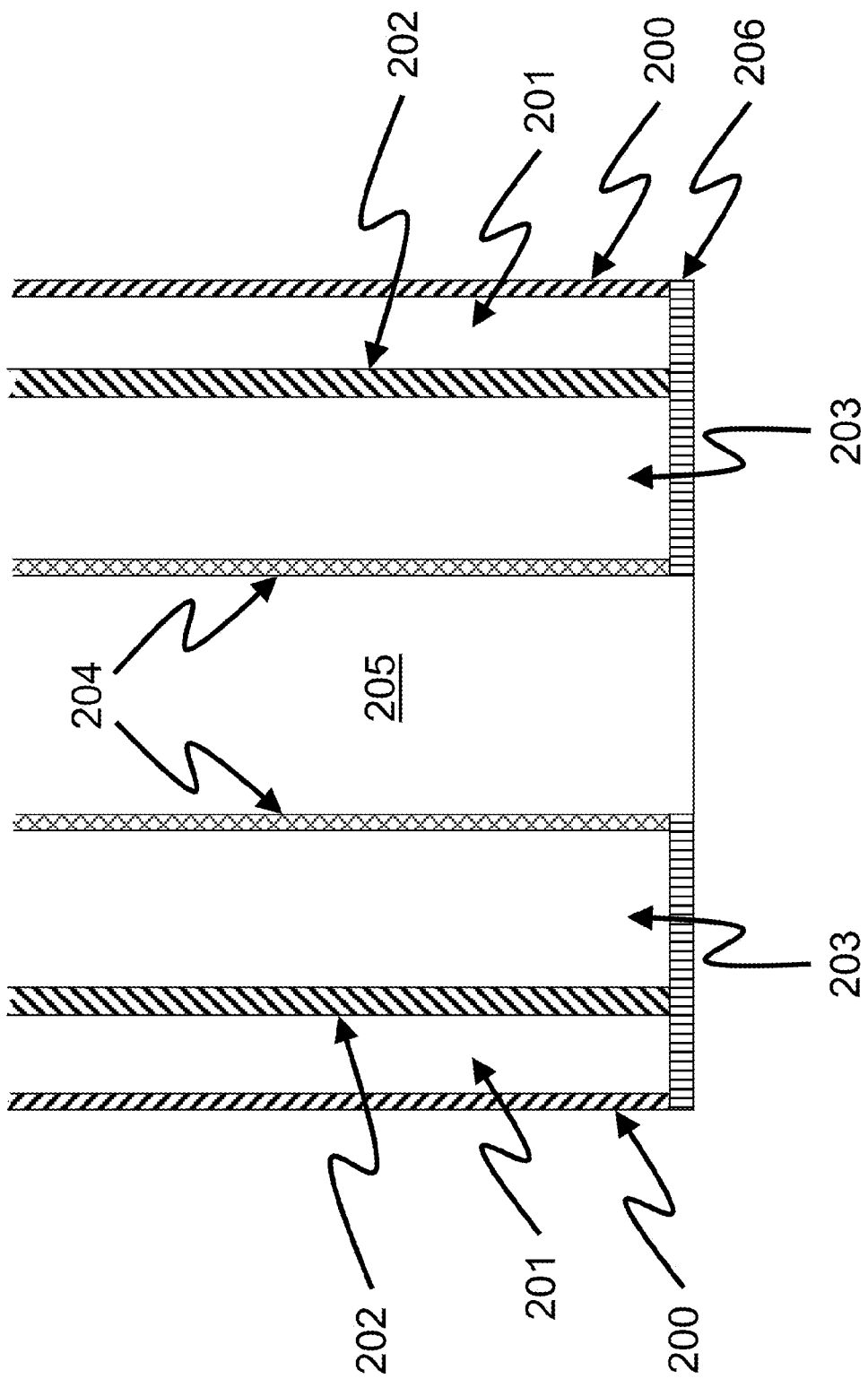
FIG. 23 is a cross-sectional side elevation view of a device in accordance with the present invention which more particularly illustrates an arrangement of internal volumes to achieve garment warming.

FIG. 23 is viewable in two ways. In its first interpretation, FIG. 23 is seen as a side elevation, cross-sectional view through a cylindrical embodiment of this aspect of the present invention. However, in a second interpretation, it is seen that the spacing for the various volumes present suggests a variation in which the material or object to be warmed is placed in volume 203. In this alternative, volume 201 is the volume that is provided with sand, oil or other convenient material for the absorption and transport of thermal energy. In either case, the volume containing the material to be warmed is releasably sealed. The volume containing thermally absorptive and conductive material is preferably permanently sealed (volumes 201 or 203 depending on the context). Sealing is provided by any convenient mechanism 206, such as a screw top, and preferably includes an O-ring seal. The precise shape of the structure is not critical and any conveniently shaped housing may be employed. While FIGS. 22 and 23 illustrate a cylindrical structure, it should be realized that any conveniently shaped structure may be employed for this purpose. These include toroids, cylinders with square cross-sections, cylinders with triangular cross-sections (long prismatic structures) and rectangular parallelopipeds. The shape is not critical. It is, however, desirable to provide as much contact with the already heated spa water as possible.

FIG. 24 is similar to FIG. 12 but adds several optional elements. In particular, pump 113 and solar collector 114 are added to the elements already identified above with respect to the discussion of FIG. 12. Solar collectors are usually disposed on the roof of the hot tub or spa. In short, wherever they are disposed, solar collectors are more apt to be present on higher structures. This means that it is harder for a spa water jet to supply water to be warmed to such a highly placed structure. This is less of a problem when a solar collector is disposed at the same level as the spa structure. For higher locations, however, it is possible to provide a pump to overcome the head of water pressure. This pump may comprise a simple hand operated pump which is usable to provide an initial priming of the conduits in the system. Thereafter, a simple circulating pump is employable. The hand pump is all that is needed to get the flow of water started through the system. Thereafter, spa jets are more than adequate to carry the water through the system. However, pump 113 may also comprise a pump that is in continuous operation.

Figure 25:
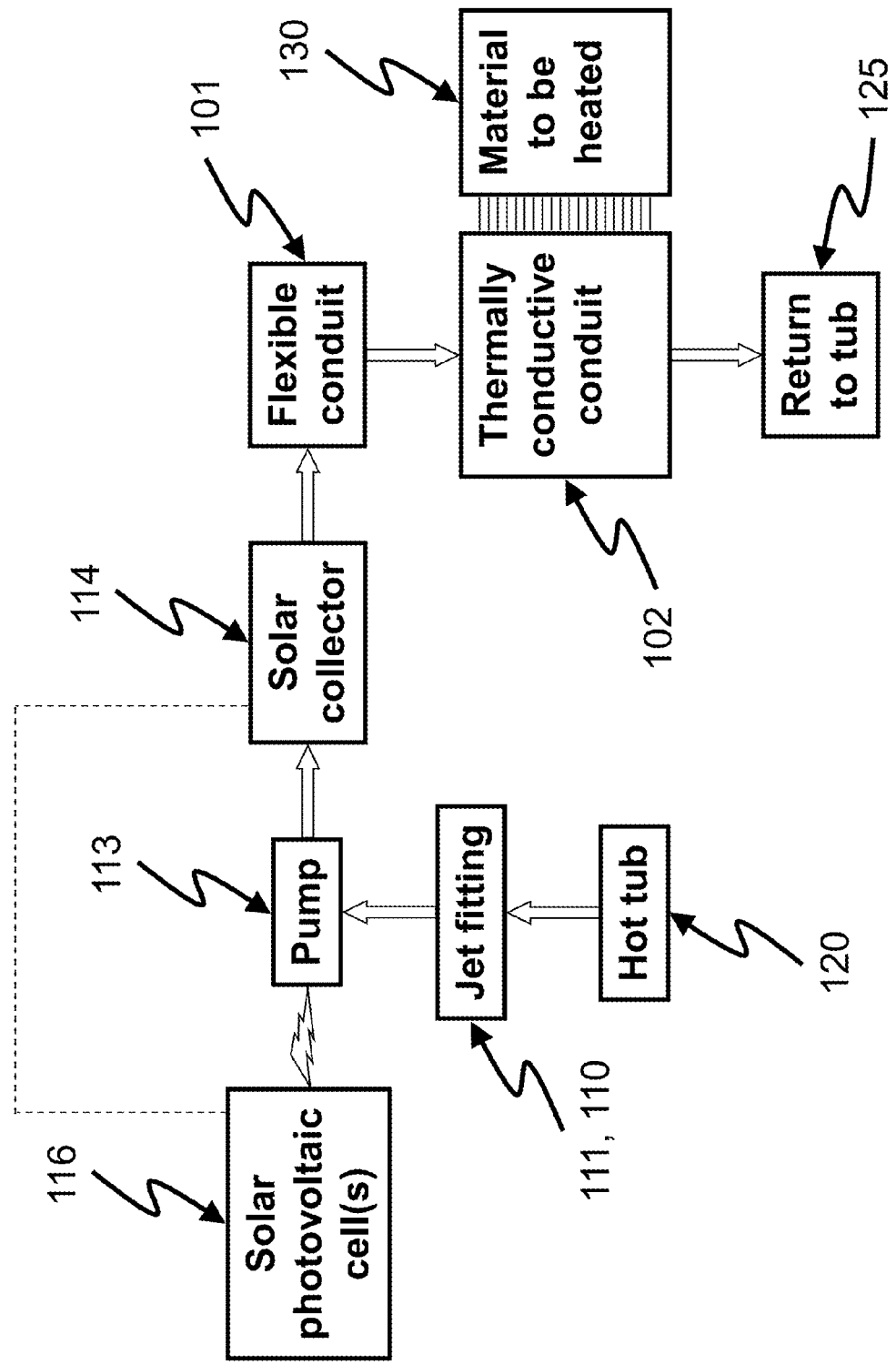
FIG. 25 is a view identical to FIG. 24 except that it illustrates the use of a solar photovoltaic unit to power a circulating pump.

FIG. 25 illustrates an embodiment of the present invention in which circulation of fluid through thermally conductive conduit 102 is provided in a manner which does not depend on the use of spa jets. In this embodiment, flow is achieved through the use of circulating pump 113 which is powered via solar photovoltaic collector 116 comprising one or more cells which convert sunlight into electrical power for pump 113. It is noted that photovoltaic collector 116 and solar collector 114 may be provided in a single unit, as suggested by the dashed line shown.

In many spas and hot tubs, chemical compounds which can be deleterious to metals are employed for various reasons including sanitizing and enhancing water clarity. Compounds of this variety typically include elements such as chlorine and bromine. In these circumstances, it is desirable that any metal conduit portions be coated with an inert coating that is immune to corrosion induced by these chemical compounds. As a further elaboration on the discussion above, it is noted that while the thermally conductive conduit may comprise a metal such as copper or aluminum (and alloys thereof). Thermally conductive plastics are employable.

As pointed out above, where the present description refers to a spa or hot tub, any other similar structure is intended as long as a source or flow of warm water is available. Likewise, while the present invention is desirable for heating towels, any other similar material may be heated, including a bathrobe or other article of clothing.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A warmer for use in conjunction with a hot tub holding heated water, said warmer comprising: a first compartment, permanently sealed against water entry, said first compartment comprising thermally conductive material and being filled with thermally absorptive material, said thermally absorptive material being selected from the group consisting of: rocks, oil and sand; a second, water tight compartment for receiving an object to be warmed, said second compartment being disposed so as to be in thermal contact with said first compartment; a removable cover for releasably sealing said second compartment, for preventing water entry into said second compartment, wherein the second compartment surrounds an outer surface of the first compartment and wherein the first compartment defines a passage therethrough for water flow through the warmer, the warmer being configured to be placed in the heated water of the hot tub thereby warming the object received in the second compartment.

2. The warmer of claim 1 in which said first compartment comprises a cylindrical structure.

3. The warmer of claim 1 in which said second compartment comprises a cylindrical structure.

4. The warmer of claim 1 in which said warmer is ballasted to float.

* * * * *